(12) United States Patent
Texter

(10) Patent No.: US 8,920,682 B2
(45) Date of Patent: Dec. 30, 2014

(54) NANOPARTICLE DISPERSIONS WITH IONIC LIQUID-BASED STABILIZERS

(75) Inventor: John Texter, Ypsilanti, MI (US)

(73) Assignee: Eastern Michigan University, Ypsilanti, MI (US)

( * ) Notice: Subject to any disclaimer, the term of this patent is extended or adjusted under 35 U.S.C. 154(b) by 635 days.

(21) Appl. No.: 13/065,272

(22) Filed: Mar. 18, 2011

(65) Prior Publication Data
US 2011/0233458 A1 Sep. 29, 2011

Related U.S. Application Data

(60) Provisional application No. 61/315,683, filed on Mar. 19, 2010, provisional application No. 61/375,267, filed on Aug. 20, 2010.

(51) Int. Cl.

| | | |
|---|---|---|
| *B82Y 30/00* | (2011.01) | |
| *B82Y 99/00* | (2011.01) | |
| *C08L 53/00* | (2006.01) | |
| *H01B 1/24* | (2006.01) | |
| *H01B 1/20* | (2006.01) | |
| *C09K 5/14* | (2006.01) | |
| *C08F 293/00* | (2006.01) | |
| *H01M 4/90* | (2006.01) | |
| *B82Y 40/00* | (2011.01) | |

(52) U.S. Cl.
CPC .............. *C09K 5/14* (2013.01); *C08F 2438/01* (2013.01); *H01M 4/90* (2013.01); *C08F 293/005* (2013.01); *H01B 1/24* (2013.01); *B82Y 30/00* (2013.01); *B82Y 40/00* (2013.01); *Y10S 977/75* (2013.01); *Y10S 977/752* (2013.01); *Y10S 977/842* (2013.01); *Y10S 977/902* (2013.01); *Y10S 977/932* (2013.01); *Y10S 977/779* (2013.01)

USPC ........... 252/511; 977/750; 977/752; 977/842; 977/902; 977/932; 977/779; 252/510; 524/516

(58) Field of Classification Search
USPC .................................................... 252/500, 75
See application file for complete search history.

(56) References Cited

U.S. PATENT DOCUMENTS

| 7,759,401 | B2 | 7/2010 | Yan et al. | |
|---|---|---|---|---|
| 2007/0265379 | A1* | 11/2007 | Chen et al. | 524/404 |
| 2011/0204281 | A1* | 8/2011 | Rouse | 252/75 |

OTHER PUBLICATIONS

Antonietti et al. ("Single-Wall Carbon Nanotube Latexes", ACS Applied Materials & Interfaces, vol. 2, No. 3, pp. 649-653, published on web Feb. 12, 2010, attached as PDF).*

(Continued)

*Primary Examiner* — Harold Pyon
*Assistant Examiner* — Katie L Hammer

(57) ABSTRACT

The disclosure generally relates to a dispersion of nanoparticles in a liquid medium. The liquid medium is suitably water-based and further includes an ionic liquid-based stabilizer in the liquid medium to stabilize the dispersion of nanoparticles therein. The stabilizer can be polymeric or monomeric and generally includes a moiety with at least one quaternary ammonium cation from a corresponding ionic liquid. The dispersion suitably can be formed by shearing or otherwise mixing a mixture/combination of its components. The dispersions can be used to form nanoparticle composite films upon drying or otherwise removing the liquid medium carrier, with the stabilizer providing a nanoparticle binder in the composite film. The films can be formed on essentially any desired substrate and can impart improved electrical conductivity and/or thermal conductivity properties to the substrate.

26 Claims, 5 Drawing Sheets

(56) References Cited

OTHER PUBLICATIONS

Di Crescenzo et al. ("Disaggregation of single-walled carbon nanotubes (SWNTs) promoted by the ionic liquid-based surfactant 1-hexadecyl-3-vinyl imidazolium bromide in aqueous solution," first published as an Advance Article on the web Sep. 24, 2008, pp. 62-66 of Soft Matter, 2009, 5; attached as PDF).*

American Elements web catalog description of Graphene. http://www.americanelements.com/cgnf.html, accessed on the Wayback Machine to show availability date of Jun. 22, 2008, attached to the case file as a PDF.*

American Elements web catalog description of Tungsten Carbide Nanoparticles. http://www.americanelements.com/wcbnp.html accessed on the Wayback Machine to show availability date of Jul. 5, 2007, attached to the case file as a PDF.*

R. Marcilla, M. L. Curri, P. D. Cozzoli, M. T. Martinez, I. Loinaz, H. Grande, J. A. Pomposo, and D. Mecerreyes, "Nano-Objects on a Round Trip from Water to Organics in a Polymeric Ionic Liquid Vehicle," Small-Journal, 2, No. 4, 507-512 (2006).

T.-H. Kim, C. Doe, S.R. Kline, S.-M. Choi, "Water-Redispersible Isolated Single-Walled Carbon Nanotubes Fabricated by In Situ Polymerization of Micelles," Adv. Mater, 2007, 19, 929-933.

R.K. Wang, H.-O. Park, W.-C. Chen, C. Silvera-Batista, R.D. Reeves, J.E. Butler, K.J. Ziegler, "Improving the Effectiveness of Interfacial Trapping in Removing Single-Walled Carbon Nanotube Bundles," J. Am. Chem. Soc. 2008, 130, 14721-14728.

Z. Wang, M.D. Shirley, S.T. Meikle, R.L.D. Whitby, S.V. Mikhalovsky, "The surface acidity of acid oxidised multi-walled carbon nanotubes and the influence of in-situ generated fulvic acids on their stability in aqueous dispersions," Carbon, 2009, 47, 73-79.

Y.K. Moon, J. Lee, J.K. Lee, Ta.K. Kim, S.H. Kim, "Synthesis of Length-Controlled Aerosol Carbon Nanotubes and Their Dispersion Stability in Aqueous Solution," Langmuir, 2009, 25, 1739-1743.

M.F. Smiechowski, V.F. Lvovich, "Characterization of non-aqueous dispersions of carbon black nanoparticles by electrochemical impedance spectroscopy," J.Electroanal. Chem. 2005, 577, 67-78.

J. Shen, Y. Hu, C. Qin, C. Li, M. Ye, "Dispersion behavior of single-walled carbon nanotubes by grafting of amphiphilic block copolymer," Composites: Part A 2008, 39, 1679-1683.

X.-L. Xie, Y.-W. Mai, S.-P. Zhou, "Dispersion and alignment of carbon nanotubes in polymer matrix: A review," Mat. Sci. Eng. R 2005, 49, 89-112.

P. Wu, X. Chen, N. Hu, U.C. Tam, O. Blixt, A. Zettl, C.R. Bertozzo, "Biocompatible Carbon Nanotubes Generated by Functionalization with Glycodendrimers," Angew. Chemie Int. Ed. 2008, 47, 5022-5025.

Y.F. Shih, L.S. Chen, R.J. Jeng, "Preparation and properties of biodegradable PBS/multi-walled carbon nanotube nanocomposites," Polymer 2008, 49, 4602-4611.

H. Kong, P. Luo, C. Gao, D. Yan, "Polyelectrolyte-functionalized multiwalled carbon nanotubes: preparation, characterization and layer-by-layer self-assembly," Polymer, 2005, 46, 2472-2485.

C.M. Homenick, G. Lawson, A. Adronov, "Polymer Nanotubes Using Living Free—Radical Polymerization," Polymer Rev. 2007, 47, 265-290.

L.J. Hubble, T.E. Clark, M. Makha, C.L. Raston, "Selective Diameter Uptake of Single-Walled Carbon Nanotubes in Water Using Phosphonated Calixarenes and 'Extended Arm' Sulfonated Calixarenes," J. Mater. Chem. 2008, 18, 5961-5966.

S. Qin, D. Qin, W.T. Ford, D.E. Resasco, J.E. Herrera, "Polymer Brushes on Single-Walled Carbon Nanotubes by Atom Transfer Radical Polymerization of n-Butyl Methacrylate," J. Am. Chem. Soc. 2004, 126, 170-176.

J.-Y. Choi, S.-W. Han, W.-S. Huh, L.-S. Tan, J.-B. Baek, "In situ grafting of carboxylic acid-terminated hyperbranched poly(etherketone) to the surface of carbon nanotubes," Polymer 2007, 48, 4034-4040.

N. Patel, S.A. Egorov, "Dispersing Nanotubes with Surfactants: A Microscopic Statistical Mechanical Analysis," J. Am. Chem. Soc. 2005, 127, 14124-14125.

L. Vaisman, H.D. Wagner, G. Marom, "The role of surfactants in dispersion of carbon nanotubes," Adv. Colloid Interface Sci. 2006, 128-130, 37-46.

Y. Tomonari, H. Murakami, N. Nakashima, "Solubilization of Single-Walled Carbon Nanotubes by using Polycyclic Aromatic Ammonium Amphiphiles in Water—Strategy for the Design of High-Performance Solubilizers," Chem. Eur. J. 2006, 12, 4027-4034.

R. Rastogi, R. Kaushal, S.K. Tripathi, A.I. Sharma, I. Kaur, L.M. Bharadwaj, "Comparative study of carbon nanotube dispersion using surfactants," J. Colloid Interface Sci. 2008, 328, 421-428.

G.A.M. Sáfar, H.B. Ribeiro, L.M. Malard, F.O. Plentz, C. Fantini, A.P. Santos, G. de Freitas-Silva, Y.M. Idemori, "Optical study of porphyrin-doped carbon nanotubes," Chem. Phys. Lett 2008, 462, 109-111.

Z. Sun, V. Nicolosi, D. Rickard, S.D. Bergin, D. Aherne, J.N. Coleman, "Quantitative Evaluation of Surfactant-stabilized Single-walled Carbon Nanotubes: Dispersion Quality and Its Correlation with Zeta Potential," J. Phys. Chem. C, 2008, 112, 10692-10699.

Y. Dror, W. Pyckhout-Hintzen, Y. Cohen, "Conformation of Polymers Dispersing Single-Walled Carbon Nanotubes in Water: A Small-Angle Neutron Scattering Study," Macromolecules, 2005, 38, 7828-7836.

J.U. Lee, J. Huh, K.H. Kim, C. Park, W.H. Jo, "Aqueous suspension of carbon nanotubes via non-covalent functionalization with oligothiophene-terminated poly(ethylene glycol)," Carbon 2007, 45, 1051-1057.

D. Wang, L. Chen, "Temperature and pH-Responsive Single-Walled Carbon Nanotube Dispersions," Nano Lett., 2007, 7, 1480-1484.

C. Doe, S.-M. Choi, S.R. Kline, H.-S. Jong, T.-H. Kim, "Charged Rod-Like Nanoparticles Assisting Single-Walled Carbon Nanotube Dispersion in Water," Adv. Funct. Mater, 2008, 18, 2685-2691.

E. Edri, O. Regev, "pH Effects on BSA-Dispersed Carbon Nanotubes Studied by Spectroscopy-Enhanced Composition Evaluation Techniques," Anal. Chem. 2008, 80, 4049-4054.

Y. Noguchi, T. Rujigaya, Y. Niidome, N. Nakashima, "Single-walled carbon nanotubes/DNA hybrids in water are highly stable," Chem. Phys. Lett. 2008, 455, 249-251.

X. Xin, G. Xu, T. Zhao, Y. Zhu, X. Shi, H. Gong, Z. Zhang, "Dispersing Carbon Nanotubes in Aqueous Solutions by a Starlike Block Copolymer," J. Phys. Chem. C, 2008, 112, 16377-16384.

S. Chen, Y. Jiang, Z. Wang, X. Zhang, L. Dai, M. Smet, "Light-Controlled Single-Walled Carbon Nanotube Dispersions in Aqueous Solution," Langmuir, 2008, 24, 9233-9236.

J. Zou, L. Liu, H. Chen, S.I. Khondaker, R.D. McCullough, Q. Huo, L. Zhai, "Dispersion of Pristine Carbon Nanotubes Using Conjugated Block Copolymers," Adv. Mater. 2008, 20, 2055-2060.

J.C. Grunlan, A.R. Mehrabi, M.V. Bannon, J.L. Bahr, "Water-Based Single-Walled-Nanotube-Filled Polymer Composite with an Exceptionally Low Percolation Threshold," Adv. Mater, 2004, 16, 150-153.

P. Vandervorst, C.-H. Lei, Y. Lin, O. DuPont, A.B. Dalton, Y.-P. Sun, J.L. Keddie, "The fine dispersion of functionalized carbon nanotubes in acrylic latex coatings," Prog. Org. Coatings 2006, 57, 91-97.

T. Fukushima, A. Kosaka, Y. Ishimura, T. Yamamoto, T. Takigawa, N. Ishii, T. Aida, "Molecular Ordering of Organic Molten Salts Triggered by Single-Walled Carbon Nanotubes," Science 2003, 300, 2072-2074.

T. Fukushima, T. Aida, "Ionic Liquids for Soft Functional Materials with Carbon Nanotubes," Chem. Eur. J. 2007, 13, 5048-5058.

T. Sekitani, Y. Noguchi, K. Hata, T. Fukushima, T. Aida, T. Someya, "A Rubberlike Stretchable Active Matrix Using Elastic Conductors," Science, 2008, 321, 1468-1472.

A. Mehta, E.J. Nelson, S.M. Webb, J.K. Holt, "The Interaction of Bromide Ions with Graphitic Materials," Adv. Mater, 2009, 21, 102-106.

W. Wenseleers, I.I. Vlasov, E. Goovaerta, E.D. Obraztsova, A.S. Lobach, A. Bouwen, "Efficient Isolation and solubilization of Pristine Single-Walled Nanotubes in Bile Salt Micelles," Adv. Funct. Mater. 2004, 14, 1105-1112.

R. Shvartzman-Cohen, M. Florent, D. Goldfarb, I. Szleifer, R. Yerushalmi-Rozen, "Aggregation and Self-Assembly of Amphiphilic Block Copolymers in Aqueous Dispersions of Carbon Nanotubes," Langmuir 2008, 24, 4625-4632.

(56) References Cited

OTHER PUBLICATIONS

V.A. Sinani, M.K. Gheith, A.A. Yaroslavov, A. Rakhnyanskaya, K. Sun, A.A. Mamedov, J.P. Wicksted, N.A. Kotov, "Aqueous Dispersions of Single-wall and Multiwall Carbon Nanotubes with Designed Amphiphilic Polycations," J. Am. Chem. Soc. 2005, 127, 3463-3472.

F. Yan, J. Texter, "Surfactant Ionic Liquid-Based Microemulsions for Polymerization," Chem. Comm. 2006, 2696-2698.

H. Hu, B. Zhao, M.E. Itkis, R.C. Haddon, "Nitric Acid Purification of Single-Walled Carbon Nanotubes," J. Phys. Chem. B 2003, 107, 13838-13842.

J. Texter, N. Tambe, R. Crombez, M. Antonietti, C. Giordano, "Stimuli Responsive Coatings of Carbon Nanotubes and Nanoparticles Using Ionic Liquid-Based Nanolatexes," Poly. Mat.; Sci. & Eng. 2010, 102, 401 (Mar. 21-25, 2010).

X. Ma, Md. Ashaduzzaman, M. Kunitake, R. Crombez, J. Texter, L. Slater, T. Mourey, "Stimuli Responsive Poly(1-[11-acryloylundecyl]-3-methyl-imidazolium bromide): Dewitting and Nanoparticle Condensation Phenomena," Langmuir 2011, 27, 7148-7157 (Apr. 28, 2011).

K. Tauer, N. Weber, J. Texter, "Core-shell Particle Interconversion with Di-stimuli-responsive Diblock Copolymers," Chem. commun., 2009, 6065-6067.

M. Antonietti, Y. Shen, T. Nakanishi, M. Manuelian, R. Campbell, L. Gwee, Y.A. Elabd, N. Tambe, R. Crombez, J. Texter, "Single-wall Carbon Nanotube Latexes," ACS Appl. Mater. Inter., 2, 2010, 649-653 (published on web Feb. 12, 2010).

C. Giordano, W. Yang, A. Lindemann, R. Crombez, J. Texter, "Waterborne WC Nanodispersions," Colloids and Surfaces A: Physicochem. Eng. Aspects 374 (2011) 84-87 (available online Nov. 13, 2010).

J. Texter, V.A. Vasantha, K. Bian, X. Ma, L. Slater, T. Mourey, G. Slater, "Stimuli Responsive Triblock Copolymers-Synthesis, Characterization, and Application," ACS Symposium Series, vol. 1066, p. 117-130 (2011) (Jun. 20, 2011).

D. England Thesis, "Materials and Coatings Derived from the Polymerizable Ionic Liquid Surfactant 1-(11-Acryloyloxyundecyl)-3-methylimidazolium Bromide," (2008) p. 1-118, Ypsilanti, Michigan.

* cited by examiner

Macroinitiator Scheme

ATRP Reaction Scheme

NANOPARTICLE DISPERSIONS WITH IONIC LIQUID-BASED STABILIZERS

CROSS-REFERENCE TO RELATED APPLICATION

Priority is claimed to U.S. Provisional Application No. 61/315,683, entitled "Nanoparticle-Nanolatex Dispersions" and filed Mar. 19, 2010 and to U.S. Provisional Application No. 61/375,267, filed Aug. 20, 2010, the disclosures of which are incorporated herein by reference in their entireties.

STATEMENT REGARDING FEDERALLY SPONSORED RESEARCH OR DEVELOPMENT

This invention was made with government support under AFOSR FA 9550-08-1-0431 by the Air Force Office of Scientific Research. The government has certain rights in the invention.

BACKGROUND OF THE DISCLOSURE

Field of the Disclosure

The disclosure generally relates to the formation of stable dispersions in an aqueous liquid medium of nanoparticles such as carbon-based nanoparticles, inorganic nanoparticles, and organic nanoparticles.

While certain nanoelectronic applications such as field effect transistor sensors may require mechanical manipulation of individual carbon nanotubes (CNT), most medium tech applications are based on more simple processing steps to create CNT dispersions in water or in nonaqueous solvents. The dispersion process generally involves two steps, exfoliation of individual or small CNT bundles from larger bundles and the stabilization of these exfoliated entities in a solvent or other separate phase. Stabilization processes can be characterized as being physical or covalent in nature. Physical methods such as blending or mixing with another phase or with a stabilizer in another phase can be distinguished from surface modification chemistries that covalently modify the surfaces of CNT to make them highly stable in a particular solvent or matrix. The latter is, however, usually accompanied with a deterioration of the positive CNT properties.

The same processes are important in creating dispersions of inorganic and organic nanoparticles. Many inorganic nanoparticles similarly suffer changes in electronic properties when stabilized by covalent surface modifications, and so physical adsorption of stabilizers is desirable. In the case of organic nanoparticles, physical stabilization is much easier and much less expensive. Nanopowders of inorganics are always aggregated, though they are preferably used in dispersion. Creating stable dispersions of nanopowders remains an important challenge, particularly when achieving stabilization by physical methods.

SUMMARY

In one aspect, the disclosure relates to a nanoparticle dispersion comprising: (a) an aqueous liquid medium; (b) an ionic liquid-based stabilizer in the aqueous liquid medium, and (c) nanoparticles dispersed in the aqueous liquid medium. The ionic liquid-based stabilizer generally comprises: (i) an aromatic heterocyclic ring having at least one quaternary ammonium cation in the ring, (ii) a counter anion to the quaternary ammonium cation (e.g., ionically bound thereto when not dissociated in solution), and (iii) optionally a surfactant moiety covalently bound to the aromatic heterocyclic ring. In some embodiments, ionic liquid-based stabilizer is in the form of a polymer (e.g., ranging from short oligomers to long polymers) comprising the aromatic heterocyclic rings as pendant groups from the polymer backbone. In other embodiments, the ionic liquid-based stabilizer is in the form of an ionic liquid surfactant (e.g., non-polymeric ionic liquid-based stabilizer) comprising the aromatic heterocyclic ring, the counter anion, and an ethylenically reactive surfactant moiety as the surfactant moiety. Combinations of two or more different types of ionic liquid-based stabilizers (e.g., polymeric, non-polymeric, and combinations thereof) are possible.

In another aspect, the disclosure relates to a process for forming a nanoparticle dispersion, the process comprising: (a) providing an aqueous liquid medium; (b) adding an ionic liquid-based stabilizer and nanoparticles to the aqueous liquid medium, thereby forming a pre-dispersion comprising the aqueous liquid medium, the ionic liquid-based stabilizer, and the nanoparticles; and (c) shearing the pre-dispersion (e.g., performing one or more high-shear mixing processes), thereby forming a nanoparticle dispersion comprising the aqueous liquid medium, the ionic liquid-based stabilizer in the aqueous liquid medium, and the nanoparticles dispersed in the aqueous liquid medium. The ionic liquid-based stabilizer generally comprises: (A) an aromatic heterocyclic ring having at least one quaternary ammonium cation in the ring, (B) a counter anion to the quaternary ammonium cation, and (C) optionally a surfactant moiety covalently bound to the aromatic heterocyclic ring. In various embodiments, the ionic liquid-based stabilizer can be alternatively in the form of (A) a polymer comprising the aromatic heterocyclic rings as pendant groups from the polymer backbone or (B) an ionic liquid surfactant comprising the aromatic heterocyclic ring, the counter anion, and an ethylenically reactive surfactant moiety as the surfactant moiety. In some embodiments, the process further comprises grinding the nanoparticles before adding the nanoparticles to the aqueous liquid medium in part (b). In some embodiments, the process further comprises shearing a mixture of the aqueous liquid medium and the ionic liquid-based stabilizer in part (b) before adding the nanoparticles to the aqueous liquid medium in part (b).

In another aspect, the disclosure relates to a nanoparticle composite film comprising: (a) a film comprising (i) nanoparticles, and (ii) an ionic liquid-based stabilizer stabilizing adjacent nanoparticles in the film (e.g., individual/discrete aliquots of stabilizer contact two or more adjacent nanoparticles to serve as a binder between the nanoparticles and create a network of the nanoparticles held together by the stabilizer, where the resulting film can be porous and/or comprise a continuous film/matrix of the stabilizer with dispersed nanoparticles), the ionic liquid-based stabilizer comprising: (A) an aromatic heterocyclic ring having at least one quaternary ammonium cation in the ring, (B) a counter anion to the quaternary ammonium cation, and (C) optionally a surfactant moiety covalently bound to the aromatic heterocyclic ring; and (b) optionally, a substrate (e.g., paper, polymer/plastic, wood, silicon, glass, quartz, metallic) to which the film is applied. In some embodiments, the ionic liquid-based stabilizer is in the form of a polymer (e.g., ranging from short oligomers to long polymers) comprising the aromatic heterocyclic rings as pendant groups from the polymer backbone. In some embodiments, the ionic liquid-based stabilizer is in the form of an ionic liquid surfactant (e.g., non-polymeric ionic liquid-based stabilizer) comprising the aromatic heterocyclic ring, the counter anion, and an ethylenically reactive surfactant moiety as the surfactant moiety. Combinations of two or more different types of ionic liquid-based stabilizers (e.g., polymeric, non-polymeric, and combinations thereof) are possible as stabilizers/binders in the nanoparticle composite film. The film can be electrically conducting and/or thermally conducting (e.g., having improved electrical and/or thermal conductivity properties relative to a substrate to which the film is applied or adhered). In various embodiments, the film has a thickness ranging from 0.02 µm to 500 µm. In some embodiments, the nanoparticles can be present in an amount ranging from 0.01 wt. % to 50 wt. % relative to the film weight, the stabilizer can be present in an amount ranging from 50 wt. % to 99.9 wt. % relative to the film weight, and/or a weight ratio of the ionic liquid-based stabilizer to the nanoparticles present in the film can range from 0.05 to 100.

In another aspect, the disclosure relates to a process for forming a nanoparticle composite film, the process comprising: (a) providing the nanoparticle dispersion according to any of the variously disclosed embodiments (e.g., any liquid medium, stabilizer, and nanoparticle combination) (b) applying the nanoparticle dispersion to a substrate; and (c) removing at least a portion of the aqueous liquid medium, thereby forming a film adhered to the substrate, where the resulting film comprises (i) the nanoparticles and (ii) the ionic liquid-based stabilizer stabilizing adjacent nanoparticles in the film (e.g., individual/discrete aliquots of stabilizer contact two or more adjacent nanoparticles to serve as a binder between the nanoparticles and create a network of the nanoparticles held together by the stabilizer, where the resulting film can be porous and/or comprise a continuous film/matrix of the stabilizer with dispersed nanoparticles). In some embodiments, ionic liquid-based stabilizer is in the form of a polymer (e.g., ranging from short oligomers to long polymers) comprising the aromatic heterocyclic rings as pendant groups from the polymer backbone. In other embodiments, the ionic liquid-based stabilizer is in the form of an ionic liquid surfactant (e.g., non-polymeric ionic liquid-based stabilizer) comprising the aromatic heterocyclic ring, the counter anion, and an ethylenically reactive surfactant moiety as the surfactant moiety. Combinations of two or more different types of ionic liquid-based stabilizers (e.g., polymeric, non-polymeric, and combinations thereof) are possible. In some embodiments, the ionic liquid-based stabilizer can be cured after application to form a polymeric ionic liquid-based stabilizer in the film (e.g., curing a non-polymeric, ethylenically reactive ionic liquid surfactant to form a polymeric stabilizer, curing a (short) oligomeric, ethylenically reactive ionic liquid-based stabilizer to form a longer polymeric stabilizer).

Various refinements of the liquid medium, ionic liquid-based stabilizer, and nanoparticles are possible in any of the aspects and embodiments of the disclosure (e.g., related to nanoparticle dispersions, methods for making nanoparticle dispersions, nanoparticle composite films, and methods for making nanoparticle composite films).

The nanoparticles suitably have a characteristic dimension ranging from 1 nm to 100 nm. In some embodiments, the nanoparticles comprise carbon, for example comprising carbon nanotubes (CNT) (e.g., single-walled carbon nanotubes (SWCNT), multi-walled carbon nanotubes (MWCNT), and combinations thereof). The CNTs suitably can be exfoliated to a degree greater than 10% by weight. Other suitable nanoparticles include those selected from the group consisting of nanotubes, nanorings, nanowires, nanorods, and combinations thereof. In addition to carbon, the nanoparticles additionally or alternatively can comprise a material selected from the group consisting of Ag, Au, Co, Fe, Mo, N, Ni, Pd, Pt, S, $SnO_2$, $TiO_2$, W, $WO_3$, ZnO, and combinations thereof. For example, the nanoparticles can be selected from the group consisting of organic pigments, nitrides, carbides, and hydrothermal carbon. In some embodiments, the nanoparticles are present in an amount ranging from 0.02 wt. % to 50 wt. % relative to the dispersion weight, and/or a weight ratio of the ionic liquid-based stabilizer to the nanoparticles present in the dispersion ranges from 0.05 to 100.

In various embodiments, the aromatic heterocyclic ring has a 5-atom or 6-atom ring structure and optionally includes one or more additional ring heteroatoms selected from the group consisting of N, O, and S. For example, the aromatic heterocyclic ring can be selected from the group consisting of pyridinium, pyridazinium, pyrimidinium, pyrazinium, oxazinium, thiazinium, imidazolium, pyrazolium, thiazolium, isothiazolium, oxazolium, isoxazolium, and triazolium. Various embodiments are possible when the ionic liquid-based stabilizer is in the form of a polymer, for example: (i) one or more of the surfactant moieties can be present as linking groups between the polymer backbone and a corresponding pendant aromatic heterocyclic ring, (ii) the polymer can be selected from the group consisting of homopolymers, random copolymers, block copolymers, and combinations thereof of monomers comprising the aromatic heterocyclic ring, (iii) the polymer can be in the form of latex nanoparticles suspended in the aqueous liquid medium, and/or (iv) the polymer can be in solution in the aqueous liquid medium. Various embodiments are possible when the ionic liquid-based stabilizer is in the form of an ethylenically reactive ionic liquid surfactant, for example: (i) the surfactant moiety can include 6 to 20 carbon atoms, and/or (ii) the ethylenically reactive group of the surfactant moiety can be a terminal group on the surfactant moiety.

The aqueous liquid medium suitably comprises water present in an amount of at least 40 wt. % relative to the total liquid medium. The aqueous liquid medium can further include a polar and/or water-miscible solvent such as propylene glycol, ethylene glycol, low molecular weight alcohols (e.g., methanol, ethanol, n-propanol, i-propanol, n-butanol, t-butanol, s-butanol), dimethyl acetamide (DMA), methyl acetamide, methyl formamide, dimethyl formamide (DMF), dimethyl sulfoxide (DMSO), tetrahydrofuran (THF), formic acid, acetic acid, formamide, acetone, acetonitrile, and combinations thereof.

In one embodiment, the invention provides a nanoparticle dispersion comprising a nanolatex comprising an imidazolium-containing ionic liquid and nanoparticles. The nanoparticles may be organic or inorganic. The nanoparticles may be nanotubes, nanorings, nanowires, or nanorods. The nanoparticles may be carbon nanotubes. The nanoparticles may be single-walled carbon nanotubes. The dispersions contain about 0.01 to 10% nanoparticles (w/w dispersion). Typically the dispersions contain about 0.02 to 2% nanoparticles (w/w dispersion). More typically the dispersions contain about 0.5% nanoparticles (w/w dispersion).

In another embodiment, the invention provides a nanoparticle film comprising a nanolatex comprising an imidazolium-containing ionic liquids and nanoparticles. The nanoparticles may be organic or inorganic. The nanoparticles may be nanotubes, nanorings, nanowires, or nanorods. The nanoparticles may be carbon nanotubes. The nanoparticles may be single-walled carbon nanotubes. The film contains about 0.01 to 20% nanoparticles (w/w film). Typically the film contains about 1 to 5% nanoparticles (w/w film). More typically the film contains about 3% nanoparticles (w/w film). The film may conduct electricity depending upon the type of nanoparticle incorporated into the film and the concentration of nanoparticles used.

In another embodiment, the invention provides a method for making a nanoparticle nanolatex dispersion, comprising mixing nanoparticles into a suspension of nanolatex and sonicating the resultant mixture. The dispersions contain about 0.01 to 10% nanoparticles (w/w dispersion). Typically the dispersions contain about 0.02 to 2% nanoparticles (w/w dispersion). More typically the dispersions contain about 0.5% nanoparticles (w/w dispersion).

The nanoparticle-nanolatex films of the invention may be used to create electrically conductive paths, such as those used for connecting electronic or electrical components, e.g., wires. The nanoparticle-nanolatex films of the invention may be used to create electrical components such as resistors, capacitors, transistors, inductors, and microchips.

Disclosed herein is the direct preparation of SWCNT nanolatex dispersions by mixing and joint ultrasonication, resulting in well dispersed systems with SWCNT concentrations of about 0.5% by weight (e.g., about 0.5% to about 1.4%) by weight. This is essentially competitive with the most concentrated aqueous suspensions reported, and about 5-100 fold more concentrated than most of the surfactant and polymer stabilization and dispersion studies in water previously reported.

All patents, patent applications, government publications, government regulations, and literature references cited in this specification are hereby incorporated herein by reference in their entirety. In case of conflict, the present description, including definitions, will control.

Additional features of the disclosure may become apparent to those skilled in the art from a review of the following detailed description, taken in conjunction with the examples, drawings, and appended claims, with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawing wherein.

Figure 1:
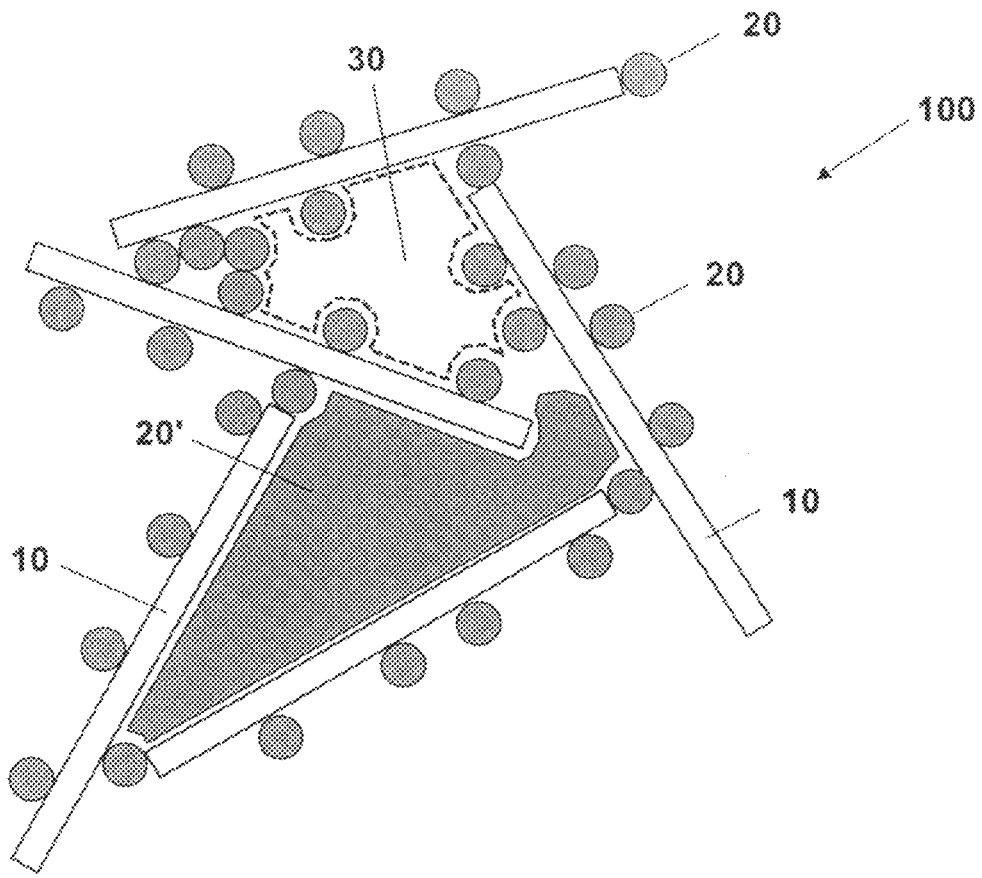
FIG. 1 illustrates a top view of a nanoparticle composite film according to an embodiment of the disclosure.

While the disclosed apparatus and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

The present disclosure generally relates to a dispersion of nanoparticles in a liquid medium. The liquid medium is suitably water-based and further includes an ionic liquid-based stabilizer in the liquid medium to stabilize the dispersion of nanoparticles therein. As described in more detail below, the stabilizer can be polymeric or monomeric and generally includes a moiety with at least one quaternary ammonium cation from a corresponding ionic liquid. The dispersion suitably can be formed by shearing or otherwise mixing a mixture/combination of its components. Dispersions according to various embodiments of the disclosure can be used to form nanoparticle composite films upon drying or otherwise removing the liquid medium carrier. The films can be formed on essentially any desired substrate and can impart improved electrical conductivity and/or thermal conductivity properties to the substrate.

Liquid Medium

The liquid medium is generally an aqueous medium that contains a substantial fraction of water, thereby imparting at least some of water's polarity and solubility characteristics to the medium. Suitably, the aqueous liquid medium contains at least 40 wt. %, 60 wt. %, 75 wt. %, 90 wt. %, 95 wt. %, 98 wt. %, or 99 wt. % (e.g., essentially 100 wt. % in some embodiments) water, based on the weight of the total liquid medium (or, alternatively, based on the weight of the dispersion as a whole).

The liquid medium can include one or more additional solvents to alter or otherwise improve the solubility characteristics of the liquid medium (e.g., selected based on a particular stabilizer used in the medium). Such additional solvents typically are polar and/or water-miscible solvents such as propylene glycol, ethylene glycol, low molecular weight alcohols (e.g., methanol, ethanol, n-propanol, i-propanol, n-butanol, t-butanol, s-butanol), dimethyl acetamide (DMA), methyl acetamide, methyl formamide, dimethyl formamide (DMF), dimethyl sulfoxide (DMSO), tetrahydrofuran (THF), formic acid, acetic acid, formamide, acetone, acetonitrile, and combinations thereof.

Nanoparticles

The nanoparticles according to the disclosure are not particularly limited and can include any desired particulate morphology having at least one nanometer-scale dimension, for example including nanotubes (e.g., carbon, boron-nitride, or other conductive materials), nanorings, nanowires (e.g., metallic or semi-conducting), nanorods, nanospheroids (e.g., generally having a spherical or quasi-spherical shape) or other suitable nanocomponent. The nanoparticles can have a characteristic dimension ranging from 1 nm to 100 nm, for example more generally at least 0.1 nm, 0.2 nm, 0.5 nm, 1 nm, 2 nm, 5 nm, 10 nm, or 20 nm and/or up to 2 nm, 5 nm, 10 nm, 20 nm, 50 nm, 100 nm, 200 nm, 300 nm, or 500 nm. The characteristic dimension can represent the diameter of a rod/tube/cylinder-like shape or the diameter/effective diameter of a bead/spherical/spheroid-like shape (e.g., a generally irregularly shaped particulate). Suitable sizes can vary according to the particular nanoparticle material; for example, MWCNTs can be about 40 nm in diameter (although some MWCNT may be thicker or thinner), SWCNTs are often as thin as a few nm in diameter, and WC dispersed nanoparticles can be in the range of about 1-2 nm. The aspect ratio of a rod/tube/cylinder-like shape (e.g., length-to-diameter ratio) can be at least $10^1$, $10^2$, $10^3$, or $10^4$ and/or up to $10^3$, $10^4$, $10^5$, $10^6$, $10^7$, or $10^8$. The aspect ratio of a bead/spherical/spheroid-like shape (e.g., a major-to-minor diameter ratio or vice versa) can range from at least 0.1, 0.2, or 0.5 and/or up to 2, 5, or 10. The characteristic dimension can represent an average size (e.g., weight, volume, or number average) and/or a size range of a distribution (e.g., weight, volume, or number average) of the nanoparticles in the dispersion.

The nanoparticles can be formed from any suitable known nanoparticle materials, for example materials including Ag, Au, C, Co, Fe, Mo, N, Ni, Pd, Pt, S, Sn, Ti, W, and Zn. The nanoparticles can be formed from any combination of the foregoing materials, for example from the element alone, from alloys of various metallic elements, from compounds including the elements (e.g., carbides such as WC, nitrides, oxides such as $SnO_2$, $TiO_2$, $WO_3$, and ZnO). The nanoparticles may be organic or inorganic, for example including various organic pigments and hydrothermal carbon. Examples of other suitable nanoparticles include gold-coated glass fibers, silver-coated glass beads, silver-coated ceramic beads, electrically conductive or semiconductive materials (e.g., conductive oxides or nitrides of various metals or metalloids). It is also possible to use a mixture of two or more different types of nanoparticles, thus providing an ability to uniquely engineer nanocomponents with desired electrical and/or chemical properties, including catalytic, photoelectric, and semiconductor properties.

In many embodiments, the nanoparticles include carbon nanotubes (CNTs). CNTs are allotropes of carbon with a nanostructure that can have a length-to-diameter ratio of up to 28,000,000:1, which is significantly larger than any other material. These cylindrical carbon molecules have novel properties that make them potentially useful in many applications in nanotechnology, electronics, optics and other fields of materials science, as well as potential uses in architectural fields. They exhibit extraordinary strength and unique electrical properties, and are efficient conductors of heat. Carbon nanorods may also be used in some embodiments. Nanotubes are members of the fullerene structural family, which also includes the spherical buckyballs. The ends of a nanotube might be capped with a hemisphere of the buckyball structure. Their name is derived from their size, since the diameter of a nanotube is on the order of a few nanometers, while they can be up to several millimeters in length. Nanotubes are categorized as single-walled carbon nanotubes (SWCNTs) and/or multi-walled carbon nanotubes (MWCNTs).

In other embodiments, the nanoparticles can include crystalline and amorphous organic particles. Aqueous suspensions of organic pigments are particularly important in ink jet printing, in formulating pigmented waterborne coatings, and in formulating inks for lithography for high end magazine publishing.

In the final dispersion, the CNTs are suitably exfoliated to a degree of at least 10%, 30%, 50%, 75%, 90%, or 100% by weight. CNTs in powder form as initially added to the dispersion liquid medium often are agglomerated together to form larger powder particle aggregates. As the stabilization process to provide the final dispersion is performed, some nanotubes are separated from the agglomerated particle, and become individually stabilized by the stabilizer. An average degree of this exfoliation process is characterized by measuring the effective optical density (e.g., at 500 nm in the visible spectrum or any other desired reference wavelength) of the dispersion. For completely exfoliated SWCNT, the effective optical density when expressed per weight fraction of SWCNT, can be about 28,000 optical density units per cm pathlength; for completely exfoliated MWCNT, it will be about 55,000 to 60,000.

The nanoparticles can be included in the dispersion in any desired absolute or relative amount. The selection of nanoparticle loading is suitably based on factors such as dispersion stability, dispersion viscosity, and a nanoparticle loading (e.g., relative to the stabilizer) in an eventual film or other composition formed from the dispersion. For example, the nanoparticles can be present in the dispersion in an amount ranging from 0.02 wt. % to 50 wt. %, 0.5 wt. % to 20 wt. %, 1 wt. % to 10 wt. %, 0.01 wt. % to 10 wt. %, or 0.02 wt. % to 2 wt. % relative to the dispersion weight. Alternatively or additionally, the nanoparticle level can be expressed as a weight ratio of the ionic liquid-based stabilizer to the nanoparticles present in the dispersion, which suitably ranges from 0.05 to 100 (e.g., at least 0.05, 0.1, 0.15, 0.2, 0.5, 1, 2, 5, 10 and/or up to 2, 3, 5, 10, 20, 50, 100, such as 0.1 to 50, 0.15-5, or 0.2-3). The various weight ratios and ranges would apply in the eventual film other composition formed from the dispersion (e.g., after removal of some or all of the liquid medium).

Ionic Liquid-Based Stabilizer

The stabilizers according to the disclosure are based on ionic liquids or ionic liquid surfactants, and generally can include the ionic liquid compounds themselves and/or polymers derived from the ionic liquid compounds (e.g., polymers including ionic liquid moieties as pendant backbone groups). Such polymers can include short oligomers (e.g., dimers, trimers, tetramers, or more generally having 2-10 repeating units), longer oligomers or short polymers (e.g., 10-100 repeating units), and/or longer polymers (e.g., at least 100 or at least 1000 repeating units) including pendant ionic liquid stabilizer moieties. Regardless of whether the stabilizer is in polymeric or monomeric form, the ionic liquid-based stabilizer includes (i) an aromatic heterocyclic ring having at least one quaternary ammonium cation in the ring, (ii) a counter anion to the quaternary ammonium cation, and (iii) optionally a surfactant moiety covalently bound to the aromatic heterocyclic ring (e.g., to the quaternary ammonium or other ring nitrogen atom thereof). While the stabilizer suitably incorporates a single type of aromatic heterocyclic ring, counter anion, and surfactant moiety, stabilizers with more than one kind of ring group, counter anion, and/or surfactant moiety can be used if desired.

The aromatic heterocyclic ring generally has a 5-atom or 6-atom aromatic hydrocarbon ring structure that includes at least one nitrogen atom in the ring (i.e., to provide the nitrogen for the quaternary ammonium cation) and that can additionally include one or more additional ring heteroatoms such as N (e.g., a second ring nitrogen), O, and/or S. While not being bound by any particular theory, it is believed that such 5- or 6-atom ring structures that are unsaturated and completely electronically delocalized provide for strong interactions with nanoparticle surfaces such as nanocarbon (e.g., graphene) surfaces, since the pi orbitals of each of these group members can exhibit strong overlap with empty pi orbitals on nanocarbon surfaces and with empty virtual orbitals directed normal to the surface of the nanoparticles. Such interactions can stabilize the nanoparticles in the dispersion liquid medium (e.g., expediting the formation of a homogeneous dispersion and/or reducing the rate at which nanoparticles in the homogenized dispersion settle or agglomerate). Such interactions further stabilize/strengthen a stabilizer-nanoparticle network in an eventual film formed from the dispersion. The various ring atoms (e.g., carbons, nitrogens, or quaternary ammonium nitrogens) can be unsubstituted (i.e., containing an H atom) or substituted (e.g., containing the surfactant moiety or a hydrocarbon group such as a (linear or branched, substituted or unsubstituted) alkyl group or an aryl group with at least 1, 2, 3, or 6 carbons and/or up to 8, 10, 12, 14, 16, 18, or 20 carbons).

Examples of suitable aromatic heterocyclic rings include pyridinium, pyridazinium, pyrimidinium, pyrazinium, oxazinium, thiazinium, imidazolium, pyrazolium, thiazolium, isothiazolium, oxazolium, isoxazolium, and triazolium, representative structures of which are illustrated below.

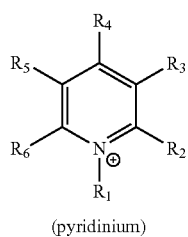

(pyridinium)

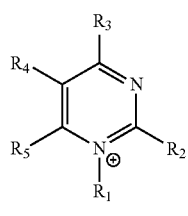

(pyrimidinium)

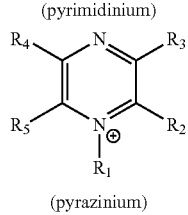

(pyrazinium)

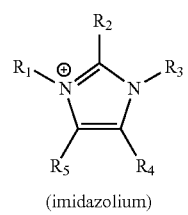

(imidazolium)

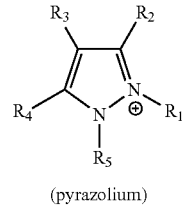

(pyrazolium)

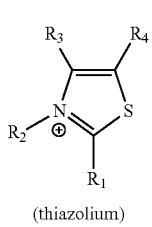

(thiazolium)

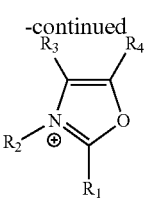

(oxazolium)

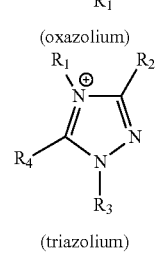

(triazolium)

In the various above structures, $R_1$, $R_2$, $R_3$, $R_4$, $R_5$, and $R_6$ (i.e., when present; where some structures only include $R_1$-$R_4$ or $R_1$-$R_5$, for example) each independently may be H, linear or branched alkyl of 1 to 20 carbon atoms (e.g., substituted or unsubstituted), aryl of 6 to 20 carbon atoms (e.g., substituted or unsubstituted), or a surfactant moiety as described below. In some embodiments, at least one of $R_1$, $R_2$, $R_3$, $R_4$, $R_5$, and $R_6$ is partly to fully fluorinated (e.g., perfluorinated). When the aromatic heterocyclic ring group is amphiphilic, at least one of $R_1$, $R_2$, $R_3$, $R_4$, $R_5$, and $R_6$ has 6-20 carbon atoms, and in certain embodiments, at least one of $R_1$, $R_2$, $R_3$, $R_4$, $R_5$, and $R_6$ includes an ethylenically reactive group such as $CH_2$=C (X) Y— (e.g., a terminal moiety for at least one of $R_1$-$R_6$, which can be a shorter linking group such as 1 to 6 carbon atoms or a longer moiety such as 6 to 20 carbon atoms or a surfactant moiety). In the reactive group, X is H, a halogen, or an alkyl of 1 to 6 carbons, and Y— represents an acyl acid, an ester, or an amide functionality, or Y is a bond or linking group connected to a useful moiety that may include any alkyl or aryl molecule having suitable liquidity or solubility (e.g., a portion of the surfactant moiety). In some embodiments, X is H or methyl so as to maximize reactivity in a chain transfer radical polymerization of the reactive group. In various embodiments, Y is a single bond, —R— (e.g., a linking group between the reactive group and the aromatic heterocyclic ring), —O—, —CO—, —CO$_2$—, —SO$_2$—, —CON(R)—, —SO$_2$N(R), —N(R)CON(R), —N(R)CO$_2$—, —COCH$_2$CH$_2$—, —OCOCH$_2$CH$_2$—, —N(R)COCH$_2$CH$_2$—, —OSO$_2$CH$_2$CH$_2$—, —SO$_2$CH$_2$CH$_2$—, wherein R is H or alkyl of 1 to 6 carbons, and Z is H, linear or branched alkyl of 1 to 10 carbon atoms, or aryl of 1 to 10 carbon atoms.

Examples of imidazolium cations illustrating suitable aromatic heterocyclic rings as well as suitable substituents thereof (including $CH_2$=C(X)Y— groups) are shown below.

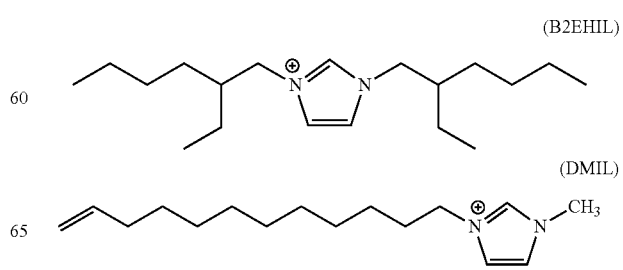

(B2EHIL)

(DMIL)

-continued

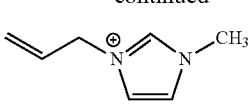

(AMIL)

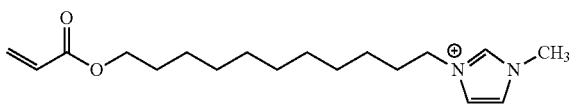

(MIL)

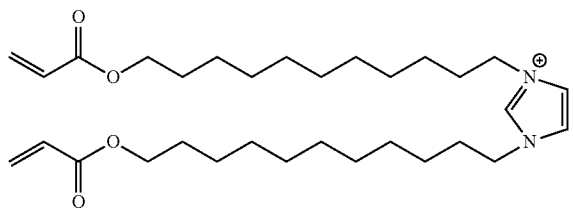

(BIL)

The counter anion to the quaternary ammonium cation of the aromatic heterocyclic ring can be any desired anion, in particular those typically useful for ionic liquids. Suitable examples include halides (e.g., $F^-$, $Cl^-$, $Br^-$, $I^-$), pseudohalides (e.g., $CN^-$, $NCS^-$, $NCO^-$, $OCN^-$), $(CF_3SO_2)_2N^-$, $BF_4^-$, and $PF_6^-$.

The surfactant moiety covalently bound to the aromatic heterocyclic ring is not particularly limited and generally includes surface active groups that preferentially aggregate at immiscible fluid interfaces and preferentially lower the higher surface energy or fluid surface tension. The surfactant moiety can generally include 6 to 20 carbon atoms (e.g., at least 6, 8, or 10 and/or up to 12, 16, or 20), for example a linear or branched aliphatic hydrocarbon group (e.g., saturated or unsaturated, substituted or unsubstituted). In some embodiments, the surfactant moiety can be ethylenically reactive, such as including a reactive group represented by $CH_2=C(X)Y-R-$, where $CH_2=C(X)Y-$ is as defined above and R is a linking group between the $CH_2=C(X)Y-$ group and the aromatic heterocyclic ring. The linking group R can include 4 to 18 carbon atoms (e.g., at least 4, 6, or 8 and/or up to 10, 14, or 18), for example a linear or branched aliphatic hydrocarbon group (e.g., saturated or unsaturated, substituted or unsubstituted). In the context of the various aromatic heterocyclic ring structures illustrated above, any (one or more than one) of the various $R_1$-$R_6$ ring substituents can be represented by the reactive surfactant moiety $CH_2=C(X)Y-R-$, which can be the same or different for various ring substituents.

In some embodiments, the ionic liquid-based stabilizer is in the form of an ionic liquid surfactant including the aromatic heterocyclic ring, the counter anion, and the surfactant moiety in any of the various above embodiments (e.g., a non-polymeric compound that is generally a liquid at room temperature (e.g., 25° C.) or other low elevated temperatures relative to room temperature). More specifically, such ionic liquid surfactants (ILS) typically have melting points close to room temperature, with melting points <100° C., <80° C., <50° C., <30° C., for example. Lower melting points minimize volatilization of the other liquid medium/dispersion components as well as minimize any activation or degradation of any thermally sensitive components in the dispersion. In some embodiments, the ionic liquid surfactants can have at least one reactively accessible double bond that is capable of polymerizing with themselves and with various other ethylenically unsaturated compounds (e.g., as represented by the $CH_2=C(X)Y-$ and $CH_2=C(X)Y-R-$ groups above). In a refinement, such reactive ionic liquid surfactants can be subsequently polymerized or cured once applied as a liquid or film to a substrate surface (e.g., based on the presence of an initiator and/or a crosslinking agent in the dispersion, and/or exposure of the applied liquid or film to a curing stimulus).

Examples of imidazolium-based ionic liquid surfactants illustrating suitable aromatic heterocyclic rings, counter anions thereof, and as suitable substituents thereof (including $CH_2=C(X)Y-$ groups) are shown below.

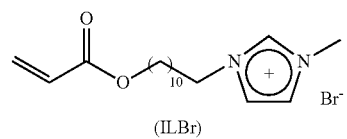

(ILBr)

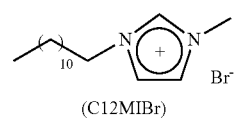

(C12MIBr)

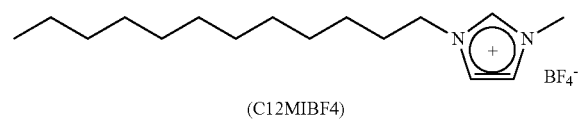

(C12MIBF4)

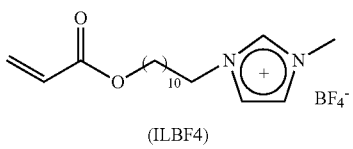

(ILBF4)

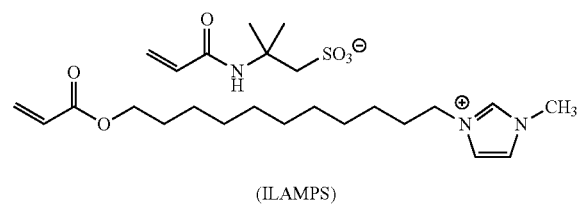

(ILAMPS)

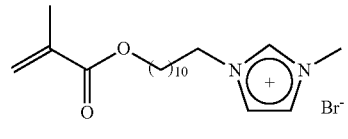

(MAUMBr)

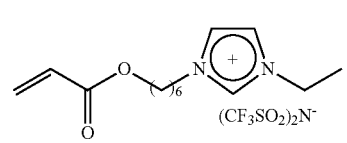

(AcC5EITFSI)

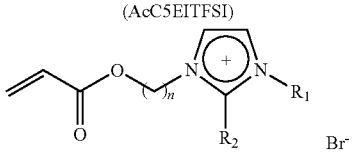

(AcCnEIBr)

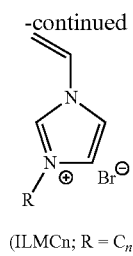

(ILMCn; R = C$_n$)

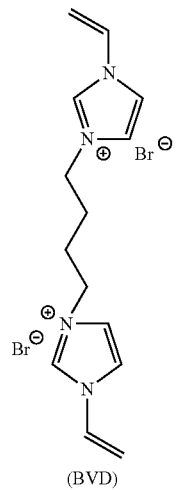

(BVD)

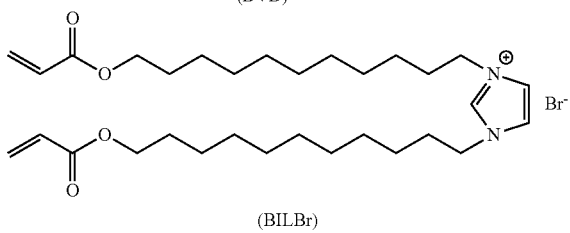

(BILBr)

In other embodiments, the ionic liquid-based stabilizer is in the form of a polymer that includes the aromatic heterocyclic rings (e.g., a plurality of one or more different ring types) as pendant groups from the polymer backbone (e.g., short/long oligomers/polymers as noted above). The polymer can be a homopolymer, random copolymer, or a block copolymer of monomers including the aromatic heterocyclic ring and counter anion. For example, the polymer can be a homopolymer of an ionic liquid surfactant monomer containing a reactive ethylenically unsaturated group either as part of the surfactant moiety or otherwise attached to the aromatic heterocyclic ring (e.g., such that there is a pendant aromatic heterocyclic ring on essentially every repeating unit of the resulting homopolymer). Similarly, the copolymer can be a random or block (e.g., diblock, triblock, or higher) copolymer of at least one ethylenically reactive ionic liquid surfactant monomer and at least one other comonomer (e.g., which can include other aromatic heterocyclic ring/counter anion combinations or can be free of ionic liquid-type functionality). Repeating units having ionic liquid functionality can be incorporated at any suitable level into the polymer/copolymer, such as at least 1%, 2%, 5%, 10%, 20%, 30%, 40%, 50%, 60%, 70%, 80%, 90%, 95%, 98%, or 99% and/or up to 2%, 5%, 10%, 20%, 30%, 40%, 50%, 60%, 70%, 80%, 90%, 95%, 98%, 99%, 100% on a weight, molar, or number basis relative to the total copolymer/repeating units therein. In some embodiments, the polymer can be crosslinked, for example resulting from the inclusion of any of a variety of conventional di- (or higher) functional ethylenically reactive crosslinking agents (e.g., including two or more vinyl groups such as acrylates, methacrylates, vinyl ethers, vinyl esters) and/or an ionic liquid surfactant comonomer that has two or more ethylenically reactive groups (e.g., surfactant moieties or otherwise) on the aromatic heterocyclic ring.

Consistent with the various above embodiments, the ethylenically reactive ionic liquid surfactant can be represented by $CH_2$=C(X) Y—R-(AHR$^+$)(CA$^-$), where $CH_2$=C(X) Y—R— is as set forth above, AHR$^+$ represents the aromatic heterocyclic ring with a quaternary ammonium cation, and CA$^-$ represents the counter anion. Suitably, the $CH_2$=C(X) Y—R— group is bound to a nitrogen or quaternary ammonium nitrogen of the aromatic heterocyclic ring (or, alternatively, a ring carbon atom), and the other ring atoms of the aromatic heterocyclic ring independently can be substituted or unsubstituted as represented by $R_1$-$R_6$ above. In this case, the resulting ionic liquid-based stabilizer polymer can be characterized as having repeating units represented by —[—$CH_2$—C(X)(Y—R-(AHR$^+$)(CA$^-$))—]$_n$—, where Y—R-(AHR$^+$)(CA$^-$) represents the pendant group containing the ionic liquid-based stabilizer functionality. In this case, the surfactant moiety (e.g., the polymerized reaction product of an unsaturated surfactant moiety in the original ionic liquid surfactant monomer) serves as a linking group between the polymer backbone and the corresponding pendant aromatic heterocyclic ring. In the case of a homopolymer, the foregoing repeating unit structure can represent essentially the entire ionic liquid-based stabilizer polymer chain. In the case of copolymers the foregoing repeating unit structure can represent one repeating unit that is in combination with one or more other repeating units to reflect the ionic liquid-based stabilizer (random or block) copolymer chain.

In other embodiments, the ethylenically reactive ionic liquid surfactant can be represented by $CH_2$=C(X)Y-(AHR$^+$—R)(CA$^-$), where $CH_2$=C(X)Y—, AHR$^+$, and CA$^-$ are as set forth above, and R represents a surfactant moiety bound to the aromatic heterocyclic ring (e.g., a carbon, a nitrogen or quaternary ammonium nitrogen of the aromatic heterocyclic ring). Suitably, the $CH_2$=C(X) Y— group is bound to a nitrogen or quaternary ammonium nitrogen of the aromatic heterocyclic ring (or, alternatively, a ring carbon atom), and the other ring atoms of the aromatic heterocyclic ring independently can be substituted or unsubstituted as represented by $R_1$-$R_6$ above. In this case, the resulting ionic liquid-based stabilizer polymer can be characterized as having repeating units represented by —[—$CH_2$—C(X)(Y-(AHR$^+$—R)(CA$^-$))—]$_n$—, where Y-(AHR$^+$—R)(CA$^-$) represents the pendant group containing the ionic liquid-based stabilizer functionality. Here, the surfactant moiety is pendant from the aromatic heterocyclic ring, but it is not directly linked to the polymer backbone (e.g., there is another, for example shorter, linking group to the polymer backbone). The foregoing repeating unit structure can be representative of homopolymers, random copolymers, and block copolymers as above.

In addition to other ethylenically reactive ionic liquid surfactant comonomers, suitable comonomers according to the disclosure can include at least some ethylenically reactive unsaturation. Particularly suitable comonomers include reactive monomers containing α-,β-ethylenic unsaturation. These include, but are not necessarily limited to, methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, .alpha.-methylstyrene, 3- and 4-chloromethylstyrene, halogen-substituted styrenes, and alkyl-substituted styrenes, vinyl halides and vinylidene halides, alkylated acrylamides (e.g., linear or branched alkyl) and methacrylamides, vinyl esters such as vinyl acetate and vinyl benzoate, vinyl ether, allyl alcohol and its ethers and esters, and unsaturated ketones and aldehydes such as acrolein and methyl vinyl ketone, isoprene, butadiene and acrylonitrile. Preferably, the monomers will be styrenics, acrylic esters, acrylamides, methacrylic esters, or methacrylamides. The foregoing ethylenically unsaturated comonomers can be used to form either random or block copolymers. In addition, when forming ionic liquid-based block copolymer stabilizers, blocks with repeating units based on non-ethylenically unsaturated comonomers can be used, for example including poly(ester), poly(amide), and poly(alkylene oxide) blocks. Blocks based on poly(urethanes), poly(ureas), and poly(dimethylsiloxanes) are also important and useful.

In various embodiments, the ionic-liquid based stabilizer can be dispersed/suspended as nano-sized particles or droplets in the liquid medium (e.g., generally having similar size characteristics as above for the nanoparticles) or the ionic-liquid based stabilizer can be solution in the liquid medium. For example, the ionic-liquid based polymer stabilizer (e.g., homopolymer or random copolymer) can be in the form of latex nanoparticles (or "nanolatex") suspended in the liquid medium and generally having sizes ranging from 10 nm, 20 nm, or 30 nm to 40 nm, 60 nm, 80 nm, or 100 nm. Nanolatex suspensions suitably can be formed as set forth in Yan et al. U.S. Pat. No. 7,759,401 (e.g., via microemulsion polymerization), the content of which is incorporated herein by reference in its entirety. Alternatively, the ionic-liquid based polymer stabilizer (e.g., homopolymer, random copolymer, block copolymer) can be dissolved in the liquid medium. Such polymers can be formed via any suitable method, for example including a solution polymerization process (e.g., a free radical polymerization process using a peroxide or other suitable free radical initiator). In some embodiments, such dissolved polymers can be stimuli responsive to certain anions in the liquid medium and can form (e.g., reversibly form) nanoparticles in the liquid medium, for example having sizes from 30 nm to 60 nm. Such ionic-liquid based polymer stabilizers, whether soluble in the liquid medium or not and whether stimuli-responsive or not, suitably can be formed using an atom transfer radical polymerization (ATRP) process using an ethylenically reactive ionic liquid surfactant monomer in combination with other ethylenically unsaturated reactive monomers (if desired), a suitable initiator (e.g., an organic halide such as an organic bromide), and catalyst (e.g., a copper halide such as Cu(I) Br).

Nanoparticle Dispersion

The nanoparticle dispersion generally can be formed by any suitable means for combining and mixing its components. In general, one or more types of ionic liquid-based stabilizers and one or more types of nanoparticles are added to the liquid medium (e.g., the aqueous liquid medium, with or without any co-solvents in addition to the water base) to form a pre-dispersion of the components. The pre-dispersion is then well mixed, typically with some form of shearing (e.g., high-shear mixing), to form the nanoparticle dispersion with the nanoparticles and ionic liquid-based stabilizer(s) stably dispersed in the liquid medium (e.g., for ionic liquid-based stabilizers that are not in solution in the liquid medium).

Prior to their addition to the liquid medium, the nanoparticles can be pre-ground. A pre-grinding step can increase the efficiency of subsequent pre-dispersion and dispersion steps. In particular, the pre-grinding step can disaggregate multi-nanoparticle aggregates and/or reduce the size of individual nanoparticles, thus increasing the specific surface area of the nanoparticles prior to their addition. Any suitable method for grinding small (nanosized) materials may be used, for example including mortar and pestle, dry fluid energy milling, small media milling, and vertical attritor milling, among others.

The mixing and shearing of the pre-dispersion to form the nanoparticle dispersion is not particularly limited, and it can include performing one or more of any of a variety of conventional high-shear mixing processes, whether batch, semi-batch, or continuous in nature. Examples of suitable high-shear mixing processes include the use of an ultrasonic bath, an ultrasonic disperser in a batch process, and a high speed mixing blade, among others. Particularly important modes of shearing and mixing during the dispersion process include small media milling using horizontal media mills, jar mills, roller mills, using vertical media mills also known as attritors, using orbital media-containing mixers and shakers, paint shakers, and small media-based vibratory shakers, among others.

In some embodiments, the ionic liquid-based stabilizer is soluble in the liquid medium, for example based on the stabilizer's solubility in water and/or the addition of a co-solvent to the liquid medium. In such cases, the ionic liquid-based stabilizer can be added to and dissolved in the liquid medium using any suitable mixing means (e.g., which need not be a high-shear mixing methods, such as simple low-speed/shear stirring and/or agitation). The adding and dissolution of the stabilizer can be performed prior or subsequent to adding the nanoparticles to the pre-dispersion. In some instances, the stabilizer can be added to the liquid medium at any convenient time, and then it can be fully dissolved into the liquid medium upon shearing of the pre-dispersion to form the nanoparticle dispersion.

In other embodiments, the ionic liquid-based stabilizer is insoluble in the liquid medium (e.g., based on the solubility characteristics of the liquid medium or the polymeric nature of certain stabilizers). For example, the stabilizer can be in the form of latex nanoparticles or other polymer nanoparticles dispersed in the liquid medium, or it can be in the form of ionic liquid surfactant droplets dispersed in the liquid medium. In such cases, the ionic liquid-based stabilizer can be added to the liquid medium, and the components can be mixed or sheared (e.g., high shear mixing such as any of those suitable for the pre-dispersion) prior to adding the nanoparticles to the liquid medium. This preliminary mixing to form a homogenous blend of the dispersed stabilizer and the liquid medium can speed the subsequent shearing and stabilization process once the nanoparticles are added to the liquid medium.

Nanoparticles including CNT such as SWCNT and MWCNT may be easily dispersed as waterborne dispersions at 0.5% by weight (e.g., up to 0.5% to 4% by weight, such as by using a nanolatex or another ionic liquid-based stabilizer according to the disclosure). Such dispersions can be dramatically concentrated by simple ultrafiltration to concentrations of 17% to 20% or more. The upper limit is usually dictated by whether or not the stabilizer interacts with itself to dramatically increase the dispersion viscosity. Coatings and castings of such dispersions may be dried to form robust films at approximately 3% by weight or higher of the nanoparticles (e.g., SWCNT, MWCNT). Earlier SWCNT latex dispersion reports cited various means to form stable SWCNT dispersions before mixing in one kind of latex (emulsion polymer) or another. In contrast, the nanoparticle dispersion according to the disclosure utilizes the ionic liquid-based stabilizer (e.g., a nanolatex or otherwise) as both (1) a stabilizer/dispersing aid in an aqueous liquid medium aid and (2) as a binder for the nanoparticles in an eventual film formed from the dispersion. The various aromatic heterocyclic ring cation/anion groups (e.g., imidazolium bromide groups) on the ionic liquid-based stabilizer (e.g., a polymer or nanolatex backbone) appear to have an affinity for SWCNT/MWCNT surfaces that provides physical bonding and stabilization.

Excellent dispersion quality is usually evidenced by having long time stability against significant gravitational sedimentation and having slow to imperceptible gravitational sedimentation (e.g., little to no perceptible sedimentation for storage periods up to 30 d, 60 d, 90 d, 180 d, or a year or more). When aggregation does commence on storage, it is usually a simple matter to recapture high dispersion stability and homogeneity by simply subjecting the dispersion to moderate to high shear.

Nanoparticle Films

The nanoparticle dispersion in any of its various embodiments is useful for forming a nanoparticle composite film having various desirable electrical and/or thermal properties, for example depending on the particular type of nanoparticle used in forming the film.

The film is formed by applying the nanoparticle dispersion to a substrate using any suitable means, for example by painting, spraying, coating, and/or dipping to contact the substrate with the liquid medium including the ionic liquid-based stabilizer and the dispersed nanoparticles. The liquid medium is then removed to form the film from the nanoparticles and stabilizer remaining on the substrate. Removal of the liquid medium can be achieved by any suitable means, for example by actively drying/heating the liquid medium on the substrate, or by simply allowing the liquid medium to evaporate over an extended period. All of the liquid medium need not be removed to form the film, although in practice, all or substantially all of the liquid medium is removed to form the eventual film with its desired strength properties. In some embodiments, the film formation process can be repeated to assemble films with a larger composite thickness. For example, the substrate for a given application of the nanoparticle dispersion is a previously formed film of the same or different composition, with the result being the formation of a multi-layered composite film (e.g., where the layers can have the same or different combinations of stabilizers and nanoparticles).

The film formed is a composite film in that it includes the nanoparticles and the ionic liquid-based stabilizer as at least two separate components. However, it need not be in the form of a composite containing a continuous matrix material and a different material dispersed in the matrix. In general, the composite film according to the disclosure has the feature that the ionic liquid-based stabilizer stabilizes/immobilizes adjacent nanoparticles in the film (e.g., where individual/discrete aliquots of stabilizer contact two or more adjacent nanoparticles to serve as a binder or "glue" between the nanoparticles and create a network of the nanoparticles held together by the stabilizer), but the stabilizer itself does not necessarily form a continuous film or matrix (although such forms are possible in various embodiments).

FIG. 1 illustrates a top view of a composite film 100 according to an embodiment of the disclosure. The film 100 typically results from nanoparticle dispersions having a low stabilizer level, a high nanoparticle loading (e.g., absolute concentrations in the dispersion), and/or a low stabilizer-to-nanoparticle ratio. In this case, the stabilizer may not be present in a sufficient amount to form a continuous film surface, with the result being a potentially porous film 100 with one or more voids 30 defined between adjacent individual nanoparticles 10 (e.g., illustrated as nanorods or nanotubes, but more generally including any type of nanoparticles). However, the stabilizer is present in sufficient amount such that individual aliquots of stabilizer 20 generally adhere to various nanoparticles 10 (e.g., as a result of an affinity between the ionic liquid stabilizer moiety and nanoparticle material in some cases), and some aliquots of stabilizer 20 can be positioned between adjacent nanoparticles 10 (e.g., in contact with two or more adjacent nanoparticles 10) to stabilize the adjacent nanoparticles 10, thereby forming a cohesive network of nanoparticles 10 generally held in place by the stabilizer 20 to collectively provide the film 100. While the stabilizer aliquots 20 are illustrated as generally round/spherical shapes (e.g., as a latex or other nanoparticle), the stabilizer aliquots 20 can more generally have any particular shape, and, in some regions of the film 100, the stabilizer may coalesce or otherwise aggregate to form a locally continuous film segment 20' (e.g., which also can stabilize adjacent nanoparticles 10) in some areas of the film 100. The presence of the voids 30 can result in a final film 100 that is porous in character. However, the formation of thicker films 100 locally having the structure illustrated in FIG. 1 can nonetheless be non-porous/non-permeable as a whole, for example resulting from highly concentrated nanoparticle dispersions and/or multiple film formation applications to form a composite film with an increased thickness.

Figure 2:
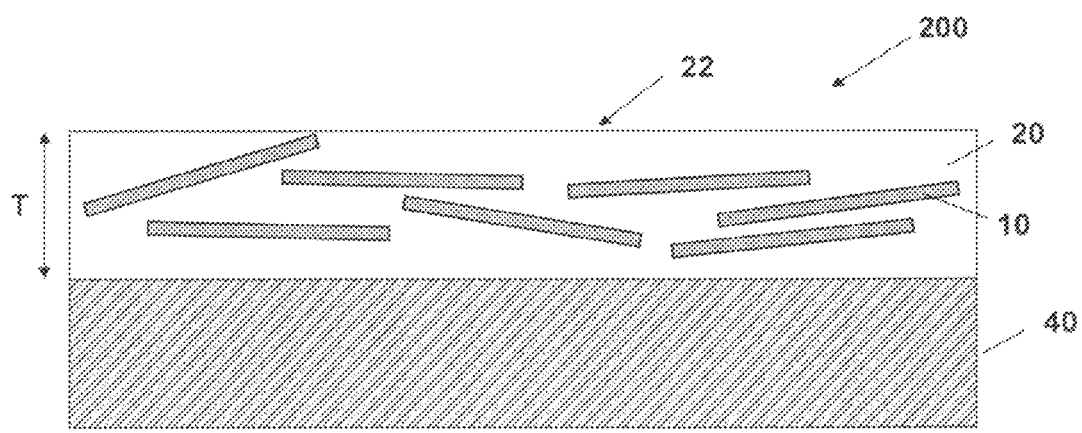
FIG. 2 illustrates a side view of a nanoparticle composite film according to an additional embodiment of the disclosure.

FIG. 2 illustrates a side view of a composite film 200 according to an additional embodiment of the disclosure. The film 200 typically results from nanoparticle dispersions having a high stabilizer level, a low nanoparticle loading (e.g., absolute concentrations in the dispersion), and/or a high stabilizer-to-nanoparticle ratio. In this case, the stabilizer is present in a sufficient amount to form a continuous film of the stabilizer 20 surface, with the result being a continuous matrix 22 (e.g., generally non-porous) film 100 the nanoparticles 10 being present as a dispersed (e.g., reinforcement) phase. In this case, the continuous stabilizer matrix 22 stabilizes the adjacent nanoparticles 10 (which may or may not be in relatively close proximity to each other) to provide the film 200. FIG. 2 further illustrates a substrate 40 to which the film 200 is applied as well as a representative dimension for the thickness T of the film 200 (e.g., normal to the substrate surface); both features apply to the embodiment of FIG. 1, but are not shown in the top view of FIG. 1.

It should be noted that FIGS. 1 and 2 illustrate two non-limiting examples of representative film morphologies obtainable with nanoparticle dispersions according to the disclosure. FIGS. 1 and 2 generally represent two ends of a continuum of films obtainable, where the particular film formed in a given application could have structural features from both illustrated embodiments, generally being a result of stabilizer concentration, nanoparticle concentration, stabilizer-to-nanoparticle ratio, number of film-forming processes performed, etc. For example, an intermediate embodiment could be result when the stabilizer amount is sufficient to essentially fill all local interstitial voids between adjacent nanoparticles (e.g., as illustrated by the locally continuous film segment 20' in FIG. 1) and provide a non-porous film, yet the stabilizer amount is too low to form the globally continuous stabilizer film/matrix 22 (e.g., as in FIG. 2).

The amount of nanoparticles and the amount of stabilizer in the film are not particularly limited and can be selected as desired. For example, the nanoparticles can be present in the film in an amount ranging from 0.01 wt. % to 50 wt. %, 0.01 wt. % to 20 wt. %, or 1 wt. % to 5 wt. % relative to the film weight, such as at least 0.01%, 0.1%, 0.2%, 0.5%, 1%, 2%, 5%, 10%, or 20% and/or up to 5%, 10%, 20%, 30%, 40%, or 50% by weight relative to the film. The stabilizer component generally represents the balance of the film (e.g., 50 wt. % to 99.99 wt. %, 80 wt. % to 99.99 wt. %, or 95 wt. % to 99 wt. % relative to the film weight, such as at least 50%, 60%, 70%, 80%, 90%, or 95% and/or up to 99.99%, 99.9%, 99.8%, 99.5%, 99%, 98%, 92%, 90%, or 80% by weight relative to the film), although other functional film additives can be added to the dispersion and be present in the final film as desired. Alternatively or additionally, the nanoparticle level can be expressed as a weight ratio of the ionic liquid-based stabilizer to the nanoparticles present in the film, which suitably ranges from 0.05 to 100 (e.g., at least 0.05, 0.1, 0.15, 0.2, 0.5, 1, 2, 5, 10 and/or up to 2, 3, 5, 10, 20, 50, 100, such as 0.1 to 50, 0.15-5, or 0.2-3).

The critical pigment or nanoparticle volume fraction can be ascertained for nanoparticles of well defined geometry and aspect ratio, so that suitable binder (e.g., including ionic liquid-based stabilizers according to the disclosure) levels can be used to achieve the desired degree of porosity or the absence of porosity, as dictated by the application of the film. Films derived from dispersions stabilized only by ionic liquid surfactant (e.g., monomer) stabilizers according to the disclosure or derived by stabilizers of any type in sufficiently small amounts will tend to lead to brittle films. In some cases it may be advantageous to add additional binder as needed, where the additional binder may be a polymeric stabilizer according to the disclosure or a conventional binder of any useful type. Useful conventional polymeric binders include latex dispersions, polyacrylates and related types of polymers, polyurethane dispersions (also waterborne), polyamides and proteins (gelatin, polyacrylamides). Nanosilicas in water are also a useful type of binder.

The nanoparticle composite film can have any desired thickness, generally based on the selection of dispersion component concentrations and the number of film-forming steps performed to create the film. In particular, the film can have a thickness generally ranging from 0.02 µm to 500 µm, for example at least 0.02 µm, 0.2 µm, 1 µm, 2 µM, 5 µm, 10 µm, or 20 µm and/or up to 10 µm, 20 µm, 50 µm, 100 µm, 200 µm; 300 µm, or 500 µm. At any thickness and/or at high nanoparticle loadings, the film can be porous if the critical pigment or nanoparticle volume fraction characteristic for the nanoparticles in question is exceeded. This is usually a formulation and film design issue, where the porosity is created or avoided, depending on the film end use. Conversely, the film can transition to a generally continuous, non-porous or otherwise impermeable film at higher thicknesses and/or lower nanoparticle loadings. In some embodiments, depending on the particular nanoparticles and/or stabilizer used, the film can be electrically and/or thermally conducting. The film can be insulating, conductive enough to dissipate static charge, or be highly conducting (>kS/cm). The film can be highly thermally conducting, and the examples herein present data that show the highest thermally conductive films ever made outside of a vacuum chamber.

The particular substrate to which the nanoparticle dispersion (and eventual film) is applied is not particularly limited, essentially including any desirable solid substrate. The substrate can be selected such that the film functionalizes or otherwise improves the properties of the substrate to form a composite layered material of the substrate and the film such that the film nanoparticles impart their desirable properties (e.g., electrical, thermal) to the substrate/composite. Examples of such substrates include paper of all kinds (e.g., magician's paper, highly nitrated paper, mulberry paper, carbon fiber paper, fiberglass paper), metal weaves, fiberglass weaves, polymer surfaces in general, polymer weaves, wood, silicon, glass, quartz, and metallic surfaces in general). In other embodiments, the substrate can be selected simply as a support for film formation, after which the film can be removed from the support and used for any desired purpose (e.g., as a film alone or applied to another substrate of interest).

Examples of specific applications for such conductive films, in view of the general adhesion of such films to polymer substrates (e.g., polypropylene and to ABS (acrylonitrile butadiene styrene) engineering plastics, as well as to metals and cellulose-based substrates, include thermally absorbing coatings for light activated sealing, antistatic discharge layers, ink jet writable conductive layers and RFID devices, and a general solution to making plastic components more amenable to electrospray and electrodeposition coating operations.

EXAMPLES

The following examples illustrate various ionic liquid-based stabilizers, nanoparticle dispersions including such stabilizers, and films formed from such dispersions according to the disclosure, but are not intended to limit the scope of the claims appended hereto.

Example 1 to Example 24

Ionic Liquid Surfactant Stabilizers

The following examples illustrate both reactive and non-reactive ionic liquid surfactant stabilizers according to the disclosure, as well as multi-functional reactive stabilizers for use as crosslinking agents in the formation of polymeric stabilizers (e.g., in combination with other mono-functional reactive surfactant stabilizers).

Example 1

Synthesis of
1-(11-acryloyloxyundecyl)-3-methylimidazolium bromide (ILBr)

The intermediate, 11-bromoundecylacrylate, was first prepared. In the first step, 100 mmol (25.12 g) 11-bromoundecanol was dissolved in 100 ml THF in a three neck 500 ml round bottom flask in an ice bath under nitrogen atmosphere. Triethylamine (120 mmol, 12.14 g, 20% excess) dissolved in 100 ml THF was added to the stirred solution. Next, 120 mmol acryloyl chloride (9.7 ml, 20% excess) was added to 100 ml THF by syringe, which was then added dropwise to the stirring 11-bromoundecanol solution over a period of 30 min by addition funnel. Once addition of acryloyl chloride was completed, the ice bath was removed. Stirring continued under a nitrogen atmosphere at room temperature for 48 hr. After 48 hr of stirring, the white salt precipitate was removed by filtration. The light yellow liquid filtrate was washed three times with 2% sodium bicarbonate in DI water solution in a 500 ml separatory funnel. The washed filtrate was dried overnight over anhydrous magnesium sulfate. The resulting filtrate was diluted with 100 ml methylene chloride and passed through a gravity column containing approximately 0.75 inches of neutral alumina. Solvents were removed by rotary evaporation at 45° C. 11-Bromoundecylacrylate was stirred with a 20% molar excess of 1-methylimidazole and 0.01% by weight 2,6-di-tert-butyl-4-methylphenol inhibitor at 40° C. for 48 hr under nitrogen atmosphere. After 48 hr, the viscous, amber liquid was washed three times with diethyl ether in a separatory funnel. The washed product was diluted with 100 ml of methylene chloride and passed through a gravity column containing approximately 0.75 inches of neutral alumina. This filtered solution was placed in a Petri dish to allow evaporation of methylene chloride at room temperature. The resulting waxy, tan IL-Br solid was dried under vacuum at room temperature, producing ILBr as a white, powdery solid.

Example 2

Synthesis of 1-(11-acryloyloxyundecyl)-3-methylimidazolium bromide (ILBr)

11-Bromoundecanol (10.00 g, 40 mmol) was dissolved in 40 ml of dry tetrahydrofuran (THF) in a two-necked round bottom flask. The flask was cooled in an ice-bath and triethylamine (5.13 mL, 40 mmol) in THF (40 mL) was added to the stirring solution. Acryloyl chloride (3.65 g, 40 mmol) dissolved in 40 ml of THF was added dropwise to the stirring solution over a period of 15 min under N2 atmosphere. The mixture was further stirred for 2 days at room temperature and was filtered. The filtrate was washed with 2% sodium bicarbonate solution to remove any unreacted acid chloride and dried over anhydrous MgSO4. The dried solution was filtered and the filtrate was passed through a short column of neutral alumina, using CH2Cl2 as the light yellow liquid (yield 10.58 g, 87%). Under N2 atmosphere, a mixture of 11-bromoundecylacrylate (6.08 g, 20 mmol) and 1-methylimidazole (1.64 g, 20 mmol) and a small amount of 2,6-di-tert-butyl-4-methylphenol (inhibitor) was stirred at 40° C. for 48 h, and yielded a viscous liquid. The viscous liquid was purified by the precipitation method with diethyl ether to obtain a yellow viscous liquid 1-(11-acryloyloxyundecyl)-3-methylimidazolium bromide. The viscous liquid was dried under vacuum at room temperature to obtain a white waxy solid (5.73 g, 74%).

Example 3

Synthesis of 1-dodecyl-3-methylimidazolium bromide (C12MIBr)

A mixture of 1-Bromododecane (12.4 g, 50 mmol) and 1-methylimidazole (4.11 g, 50 mmol) was stirred at 75° C. for 24 h. The viscous liquid was washed with ethyl acetate several times and heated at 85° C. under vacuum for 24 h to produce waxy 1-dodecyl-3-methylimidazolium bromide (15.64 g, 83%).

Example 4

Synthesis of 1-dodecyl-3-methylimidazolium tetrafluoroborate (C12MIBF4)

1 Dodecyl-3-methylimidazolium bromide (6.62 g, 20 mmol, C12MIBr) was dissolved in 50 mL of dry acetonitrile and stirred with NaBF4 (2.75 g, 25 mol) at 40° C. After the mixture was stirred for 48 h, the sodium bromide precipitate was removed by filtration and the filtrate was concentrated. The concentrated filtrate was diluted with methylene chloride (300 mL) and filtered through a short column of silica gel. The Br— concentration was checked qualitatively by the formation of AgCl after adding of silver nitrate ($AgNO_3$) into the decanted water. The resulting ionic liquid 1-dodecyl-3-methylimidazolium tetrafluoroborate was heated at 80° C. under vacuum for 12 h. (5.49 g, 81% yield).

Example 5

Synthesis of 1-(11-acryloylundecyl)-3-methylimidazolium tetrafluoroborate (ILBF4)

This derivative is derived from ILBr by ion exchange. First, ILBr (7.74 g, 20 mmol) was dissolved in 50 mL of dry acetonitrile and stirred with NaBF4 (2.75 g, 25 mol) at room temperature. After the mixture was stirred for 48 h under N2 atmosphere, the sodium bromide precipitate was removed by filtration and the filtrate was concentrated. The concentrated filtrate was diluted with methylene chloride (300 mL) and filtered through a short column of silica gel. The Br— concentration was checked qualitatively by the formation of AgCl after adding of silver nitrate (AgNO3) into the decanted water. The resulting ionic liquid 1-(11-acryloyloxyundecyl)-3-methylimidazolium tetrafluoroborate was dried under vacuum for 24 h as the white waxy solid. (6.24 g, 79% yield).

Example 6

Synthesis of 1-(11-acryloylundecyl)-3-methylimidazolium tetrafluoroborate (ILBF4)

First, 15.48 g (40 mmol) ILBr was dissolved in 100 ml dry acetonitrile and was stirred with $NaBF_4$ (5.50 g, 50 mmol) under nitrogen atmosphere at room temperature for 2 days. The precipitate was removed by filtration and the filtrate was concentrated by rotaryvaporator. The concentrated filtrate was diluted with 100 ml methylene chloride and filtered through a short column of silica gel. Solvent was evaporated at room temperature under a ventilated hood to precipitate the ionic liquid. After dried in vacuum oven a couple of hours at room temperature, the resulting ionic liquid was white powdery solid.

Example 7

Synthesis of ILAMPS

First, 2.07 g (10 mmol) 2-acrylamido-2-methyl-1-propanesulfonic acid (HAMPS) was dissolved in 3.00 g deionized water. Then 1.17 g (11 mmol) silver (I) oxide was added into the solution. The mixture was shaken vigorously. The excess silver oxide was left behind by decanting the top solution after centrifugation. Then 3.87 g (10 mmol) ILBr was added into the silver salt solution and the precipitate was centrifuged off. To the resulting ILAMPS solution was added 0.02 wt % 4-methoxyphenol (MEHQ) to inhibit polymerization during drying, and the product was obtained by drying in a vacuum oven slowly to yield the yellow brown wax solid.

Example 8

Synthesis of 1-(9-acryloyloxyundecyl)-3-methylimidazolium bromide (AcC9MIBr)

The synthesis of AcC9MIBr was done using the procedure of Example 2, but substituting 9-bromo-1-nonanol for the bromoundecanol.

Example 9

Synthesis of 1-(11-methacryloyloxyundecyl)-3-methylimidazolium bromide (MAUMBr)

(From Yu et al., Macromolecules 2008, 41, 3389-3392.) 11-Bromoundecanol (10.00 g, 40 mmol) was dissolved in 40 ml of dry tetrahydrofuran (THF) in a two-necked round bottom flask. The flask was cooled in an ice-bath and triethylamine (5.13 mL, 40 mmol) in THF (40 mL) was added to the stirring solution. 2-methyl acryloyl chloride (4.08 g, 40 mmol) dissolved in 40 ml of THF was added dropwise to the stirring solution over a period of 15 min under N2 atmosphere. The mixture was further stirred for 2 days at room temperature and was filtered. The filtrate was washed with 2% sodium bicarbonate solution to remove any unreacted acid chloride and dried over anhydrous $MgSO_4$. The dried solution was filtered and the filtrate was passed through a short column of neutral alumina, using CH2Cl2 as the light yellow liquid (yield 10.58 g, 87%). Under N2 atmosphere, a mixture of 11-bromoundecyl methylacrylate (6.08 g, 20 mmol) and 1-methylimidazole (1.64 g, 20 mmol) and a small amount of 1,4-dihydroxybenzene (inhibitor) was stirred at 40° C. for 48 h, and yielded a viscous liquid. The viscous liquid was purified by the precipitation method with diethyl ether to obtain yellow viscous liquid 1-(2-acryloyloxyundecyl)-3-methylimidazolium bromide. The viscous liquid was dried under vacuum at room temperature as the white waxy solid (5.73 g, 74%).

Example 10

Synthesis of 1-(6-acryloyloxyhexyl)-3-ethylimidazolium bromide (AcC6EIBr)

(From Washiro et al., Polymer 45 (2004) 1577-1582; Yoshizawa & Ohno, Electrochimica Acta 46 (2001) 1723-1728.) A THF solution of acryloyl chloride was added slowly under nitrogen into a THF solution at 0° C. of an equimolar amount of 6-bromo-1-hexanol in tetrahydrofuran in the presence of triethylamine to prepare the bromohexyl acrylate. The approximately 200 mL of THF was removed by rotary evaporation. This intermediate was then washed with water and diethyl ether, and the diethyl ether was then removed by rotary evaporation, and the product was dried in vacuo at room temperature. This intermediate was then mixed with excess ethylimidazole for 3 days at 45° C. The product was then obtained by precipitation with anhydrous diethyl ether.

Example 11

Synthesis of 1-(9-acryloyloxyhexy-1)-3-ethylimidazolium bromide (AcC9EIBr)

(From Washiro et al., Polymer 45 (2004) 1577-1582; Yoshizawa & Ohno, Electrochimica Acta 46 (2001) 1723-1728.) A THF solution of acryloyl chloride was added slowly under nitrogen into a THF solution at 0° C. of an equimolar amount of 9-bromo-1-nonanol in tetrahydrofuran in the presence of triethylamine to prepare the bromohexyl acrylate. The approximately 200 mL of THF was removed by rotary evaporation. This intermediate was then washed with water and diethyl ether, and the diethyl ether was then removed by rotary evaporation, and the product was dried in vacuo at room temperature. This intermediate was then mixed with excess ethylimidazole for 3 days at 45° C. The product was then obtained by precipitation with anhydrous diethyl ether.

Example 12

Synthesis of 1-(12-acryloyloxydodecyl)-3-ethylimidazolium bromide (Acc12EIBr)

(From Washiro et al., Polymer 45 (2004) 1577-1582; Yoshizawa & Ohno, Electrochimica Acta 46 (2001) 1723-1728.) A THF solution of acryloyl chloride was added slowly under nitrogen into a THF solution at 0° C. of an equimolar amount of 9-bromo-1-dodecanol in tetrahydrofuran in the presence of triethylamine to prepare the bromohexyl acrylate. The approximately 200 mL of THF was removed by rotary evaporation. This intermediate was then washed with water and diethyl ether, and the diethyl ether was then removed by rotary evaporation, and the product was dried in vacuo at room temperature. This intermediate was then mixed with excess ethylimidazole for 3 days at 45° C. The product was then obtained by precipitation with anhydrous diethyl ether.

Example 13

Synthesis of 1-(6-acryloyloxyhexyl)-3-methylimidazolium bromide (AcC6MIBr)

(From Washiro et al., Polymer 45 (2004) 1577-1582; Yoshizawa & Ohno, Electrochimica Acta 46 (2001) 1723-1728.) A THF solution of acryloyl chloride was added slowly under nitrogen into a THF solution at 0° C. of an equimolar amount of 6-bromo-1-hexanol in tetrahydrofuran in the presence of triethylamine to prepare the bromohexyl acrylate. The approximately 200 mL of THF was removed by rotary evaporation. This intermediate was then washed with water and diethyl ether, and the diethyl ether was then removed by rotary evaporation, and the product was dried in vacuo at room temperature. This intermediate was then mixed with excess methylimidazole for 3 days at 45° C. The product was then obtained by precipitation with anhydrous diethyl ether.

Example 14

Synthesis of 1-(6-acryloyloxyhexyl)-3-butylimidazolium bromide (AcC6BIBr)

(From Washiro et al., Polymer 45 (2004) 1577-1582; Yoshizawa & Ohno, Electrochimica Acta 46 (2001) 1723-1728.) A THF solution of acryloyl chloride was added slowly under nitrogen into a THF solution at 0° C. of an equimolar amount of 6-bromo-1-hexanol in tetrahydrofuran in the presence of triethylamine to prepare the bromohexyl acrylate. The approximately 200 mL of THF was removed by rotary evaporation. This intermediate was then washed with water and diethyl ether, and the diethyl ether was then removed by rotary evaporation, and the product was dried in vacuo at room temperature. This intermediate was then mixed with excess butylimidazole for 3 days at 45° C. The product was then obtained by precipitation with anhydrous diethyl ether.

Example 15

Synthesis of
1-(6-acryloyloxyhexyl)-2-methyl-3-ethylimidazolium
bromide (AcC6EMIBr)

(From Washiro et al., Polymer 45 (2004) 1577-1582; Yoshizawa & Ohno, Electrochimica Acta 46 (2001) 1723-1728.) A THF solution of acryloyl chloride was added slowly under nitrogen into a THF solution at 0° C. of an equimolar amount of 6-bromo-1-hexanol in tetrahydrofuran in the presence of triethylamine to prepare the bromohexyl acrylate. The approximately 200 mL of THF was removed by rotary evaporation. This intermediate was then washed with water and diethyl ether, and the diethyl ether was then removed by rotary evaporation, and the product was dried in vacuo at room temperature. This intermediate was then mixed with excess 1-ethyl-2-methylimidazole for 3 days at 45° C. The product was then obtained by precipitation with anhydrous diethyl ether.

Example 16

Synthesis of 1-vinyl-3-octyl imidazolium bromide (ILMC8)

(From Yuan & Antonietti, DOI: 10.1021/ma102858b.) A solution/suspension comprising 0.1 mol of 1-vinylimidazole, 0.1 mol of n-octyl bromide and 30 mL of methanol were loaded into a 100 mL reactor. The mixture was stirred at 60° C. for 15 h. After cooling the reaction mixture was added dropwise into 1 L of diethyl ether. The precipitate was filtered off and dried at room temperature to yield a yellow liquid.

Example 17

Synthesis of 1-vinyl-3-decyl imidazolium bromide (ILMC10)

(From Yuan & Antonietti, DOI: 10.1021/ma102858b.) A solution/suspension comprising 0.1 mol of 1-vinylimidazole, 0.1 mol of n-decyl bromide and 30 mL of methanol were loaded into a 100 mL reactor. The mixture was stirred at 60° C. for 15 h. After cooling the reaction mixture was added dropwise into 1 L of diethyl ether. The white precipitate was filtered off and dried at room temperature to yield a powder.

Example 18

Synthesis of 1-vinyl-3-dodecyl imidazolium bromide (ILMC12)

(From Yuan & Antonietti, DOI: 10.1021/ma102858b.) A solution/suspension comprising 0.1 mol of 1-vinylimidazole, 0.1 mol of n-dodecyl bromide and 30 mL of methanol were loaded into a 100 mL reactor. The mixture was stirred at 60° C. for 15 h. After cooling the reaction mixture was added dropwise into 1 L of diethyl ether. The white precipitate was filtered off and dried at room temperature to yield a powder.

Example 19

Synthesis of 1-vinyl-3-tetradecyl imidazolium bromide (ILMC14)

(From Yuan & Antonietti, DOI: 10.1021/ma102858b.) A solution/suspension comprising 0.1 mol of 1-vinylimidazole, 0.1 mol of n-tetradecyl bromide and 30 mL of methanol were loaded into a 100 mL reactor. The mixture was stirred at 60° C. for 15 h. After cooling the reaction mixture was added dropwise into 1 L of diethyl ether. The white precipitate was filtered off and dried at room temperature to yield a powder.

Example 20

Synthesis of 1-vinyl-3-hexadecyl imidazolium bromide (ILMC16)

(From Yuan & Antonietti, DOI: 10.1021/ma102858b.) A solution/suspension comprising 0.1 mol of 1-vinylimidazole, 0.1 mol of n-hexadecyl bromide and 30 mL of methanol were loaded into a 100 mL reactor. The mixture was stirred at 60° C. for 15 h. After cooling the reaction mixture was added dropwise into 1 L of diethyl ether. The white precipitate was filtered off and dried at room temperature to yield a powder.

Example 21

Synthesis of 1-vinyl-3-octadecyl imidazolium bromide (ILMC18)

(From Yuan & Antonietti, DOI: 10.1021/ma102858b.) A solution/suspension comprising 0.1 mol of 1-vinylimidazole, 0.1 mol of n-octadecyl bromide and 30 mL of methanol were loaded into a 100 mL reactor. The mixture was stirred at 60° C. for 15 h. After cooling the reaction mixture was added dropwise into 1 L of diethyl ether. The white precipitate was filtered off and dried at room temperature to yield a powder.

Example 22

Synthesis of
1,4-butanediyl-3,3'-bis-1-vinylimidazolium
dibromide (BVD)

(From Yuan & Antonietti, DOI: 10.1021/ma102858b.) A solution/suspension comprising 0.2 mol of 1-vinylimidazole, 0.1 mol of 1,4-dibromobutane and 30 mL of methanol were loaded into a 100 mL reactor. The mixture was stirred at 60° C. for 15 h. After cooling the reaction mixture was added dropwise into 1 L of diethyl ether. The white precipitate was filtered off and dried at room temperature to yield a powder. The resulting di-functional reactive ionic liquid-based surfactant could be used as a crosslinking agent in combination with other reactive ionic liquid-based surfactants to form a crosslinked polymeric ionic liquid-based surfactant.

Example 23

Synthesis of
1,3-bis(acryloyloxyundecyl)limidazolium bromide
(BILBr)

This cross-linking monomer was produced at the level of about 0.5 to 2% by weight as a byproduct in the syntheses of ILBr as described in Example 1 and Example 2.

Example 24

Synthesis of
1,3-bis(acryloyloxyundecyl)limidazolium bromide
(BILBr)

Imidazole and two equivalents of 11-acryloyloxyundecyl-bromide are combined in THF and mixed at room temperature for three days, along with one equivalent of triethhyl amine. The HBr/triethylamine salt is removed by washing with water after rotoevaporation of the THF. The product is obtained as a tan solid after trituration with diethyl ether.

Example 25 to Example 36

Polymeric Nanolatex Ionic Liquid-Based Stabilizers

The following examples illustrate polymeric nanolatex ionic liquid-based stabilizers according to the disclosure (e.g., formed by microemulsion polymerization), including copolymers and crosslinked polymers.

Example 25

Synthesis of Nanolatex 1

A 60% by weight solution of ILBr in MMA (methylmethacrylate) containing the initiator AIBN (2,2-azobisisobutyronitrile) at a level of 0.5% relative to total monomer weight was combined with water to a total volume of 25 mL so that the resulting microemulsion was 2% by weight in ILBr. This transparent microemulsion was then heated overnight at 60° C. in a temperature controlled bath to produce a nanolatex suspension 3.33% by weight solids. This latex was then dialyzed against deionized water for three days using regenerated cellulose dialysis tubing (Fisher Scientific) with a molecular weight cutoff of 12,000-14,000 g/mol. The final nanolatex suspension was 1.6% by weight solids.

Example 26

Synthesis of Nanolatex 2

The procedure of Example 25 was followed except that the 25 mL transparent microemulsion was formulated to be 3% by weight in ILBr, and a nanolatex suspension 5% by weight solids was obtained. After dialysis the final nanolatex suspension was 2.4% by weight solids.

Example 27

Synthesis of Nanolatex 3

The procedure of Example 25 was followed except that the 25 mL transparent microemulsion was formulated to be 4% by weight in ILBr, and a nanolatex suspension 6.67% by weight solids was obtained. After dialysis the final nanolatex suspension was 3.7% by weight solids Example 28

Synthesis of Nanolatex 4

Thermally initiated microemulsion polymerization of the ILBr/MMA/H$_2$O system at respective weight fractions of 0.07, 0.07, and 0.86, with AIBN added at 0.5% by weight of the MMA, resulted in polymer latexes without any apparent aggregation. The average diameter of these nanoparticles was about 30 nm.

Example 29

Synthesis of Nanolatex 5

Thermally initiated microemulsion polymerization of the C12MIBr/MMA/H$_2$O system at respective weight fractions of 0.04, 0.04, and 0.92, with AIBN added at 0.5% by weight of the MMA, resulted in polymer nanolatex having an average diameter of about 50 nm.

Example 30

Synthesis of Nanolatex 6

(From Yuan & Antonietti, DOI: 10.1021/ma102858b.) In a 250 mL Schlenk flask, 5 g of ILMC12, 150 mg of VA86 thermal initiator, and 100 mL of water were mixed. The mixture was completely deoxygenated by three cycles of freeze-pump-thaw procedure and was backfilled with argon. The flask was then stirred in an oil bath thermostated at 70° C. for 24 h. Nanolatex particles having 20-25 nm average diameter were obtained with essentially full conversion.

Example 31

Synthesis of Nanolatex 7

(From Yuan & Antonietti, DOI: 10.1021/ma102858b.) In a 250 mL Schlenk flask, 5 g of ILMC14, 150 mg of VA86 thermal initiator, and 100 mL of water were mixed. The mixture was completely deoxygenated by three cycles of freeze-pump-thaw procedure and was backfilled with argon. The flask was then stirred in an oil bath thermostated at 70° C. for 24 h. Nanolatex particles having 28-35 nm average diameter were obtained with essentially full conversion.

Example 32

Synthesis of Nanolatex 8

(From Yuan & Antonietti, DOI: 10.1021/ma102858b.) In a 250 mL Schlenk flask, 5 g of ILMC16, 150 mg of VA86 thermal initiator, and 100 mL of water were mixed. The mixture was completely deoxygenated by three cycles of freeze-pump-thaw procedure and was backfilled with argon. The flask was then stirred in an oil bath thermostated at 70° C. for 24 h. Nanolatex particles having 31-32 nm average diameter were obtained with essentially full conversion.

Example 33

Synthesis of Nanolatex 9

(From Yuan & Antonietti, DOI: 10.1021/ma102858b.) In a 250 mL Schlenk flask, 5 g of ILMC18, 150 mg of VA86 thermal initiator, and 100 mL of water were mixed. The mixture was completely deoxygenated by three cycles of freeze-pump-thaw procedure and was backfilled with argon. The flask was then stirred in an oil bath thermostated at 70° C. for 24 h. Nanolatex particles having 25-37 nm average diameter were obtained with essentially full conversion.

Example 34

Synthesis of Nanolatex 10

(From Yuan & Antonietti, DOI: 10.1021/ma102858b.) In a 250 mL Schlenk flask, 5 g of ILMC14, 10 mole % of BVD crosslinker, relative to ILMC14, 150 mg of VA86 thermal initiator, and 100 mL of water were mixed. The mixture was completely deoxygenated by three cycles of freeze-pump-thaw procedure and was backfilled with argon. The flask was then stirred in an oil bath thermostated at 70° C. for 24 h.

Nanolatex particles having 25-30 nm average diameter were obtained with essentially full conversion.

Example 35

Synthesis of Nanolatex 11

(From Yuan & Antonietti, DOI: 10.1021/ma102858b.) In a 250 mL Schlenk flask, 5 g of ILMC16, 10 mole % of BVD crosslinker, relative to ILMC16, 150 mg of VA86 thermal initiator, and 100 mL of water were mixed. The mixture was completely deoxygenated by three cycles of freeze-pump-thaw procedure and was backfilled with argon. The flask was then stirred in an oil bath thermostated at 70° C. for 24 h. Nanolatex particles having 24-26 nm average diameter were obtained with essentially full conversion.

Example 36

Synthesis of Nanolatex 12

(From Yuan & Antonietti, DOI: 10.1021/ma102858b.) In a 250 mL Schlenk flask, 5 g of ILMC18, 10 mole % of BVD crosslinker, relative to ILMC18, 150 mg of VA86 thermal initiator, and 100 mL of water were mixed. The mixture was completely deoxygenated by three cycles of freeze-pump-thaw procedure and was backfilled with argon. The flask was then stirred in an oil bath thermostated at 70° C. for 24 h. Nanolatex particles having 22-34 nm average diameter were obtained with essentially full conversion.

Example 37 to Example 50

Solution Polymeric Ionic Liquid-Based Stabilizers

The following examples illustrate polymeric ionic liquid-based stabilizers according to the disclosure formed by solution polymerization (e.g., atom transfer radical polymerization and free radical polymerization), including homopolymers and copolymers.

Example 37

Synthesis of Poly(ILBr) Homopolymer

Solubility of the initiator, BMMB (4-bromomethyl methyl benzoate), in the reactions solvent, methanol/water, was determined by optical turbidity assessments to be 0.95 g/L. Methanol (4.2 mL) and water (3 mL) (7:5 v/v) were taken into a reaction flask and further purged with Ar for another 10 minutes. HMTETA (0.25 mmol, 57.6 mg, 68 µL) ligand and CuBr (0.2 mmol, 30 mg) catalyst were then charged in the flask successively. The solution appeared very light green in color after purging for 10 minutes. ILBr monomer (6.46 mmol, 2.50 g) was then added and purging was continued for 5 minutes. Additional CuBr (0.1 mmol, 15 mg) was added and the solution became bluish green. Finally, BMMB (0.2 mmol, 46 mg; a 6.4 fold excess for the solvent volume used) initiator was added and the reaction flask was then placed in a pre-heated oil bath at 40° 0° C. with stirring, followed by degassing with a pump and backfilling with Ar (10 minutes). The emulsified reaction mixture was stirred for 48 h. After 48 h, the product reaction was cooled to room temperature and taken into a dialysis tube (SNAKESKIN pleated dialysis tubing, MWCO 3500, length 25 cm). Product adhering to the reaction flask was removed by rinsing with deionized water and adding to the dialysis tubing contents. Dialysis was performed in a 4 L vessel containing a magnetic stirrer to accelerate the rate of dialysis against deionized water. Water was changed frequently during the first 12 h. Almost all CuBr/HMTETA and monomer were removed from the system within this time. Dialysis was continued for another 36 h (changing water every 12 h). A white polymer was obtained after lyophilization of the dialysis tube contents. The yield was ca. 60% w/w. The molecular weight distribution determined by size exclusion chromatography gave an Mn of 41,200 Da and an Mw of 248,000 Da.

Example 38

Synthesis of Poly(ILBr) Homopolymer

This homopolymer was prepared in DMF solution. The ILBr monomer content was 10% (w/w) in the solvent; dissolving 0.3 g of ILBr was dissolved in 2.7 g of DMF in a screw capped culture tube. Then 1.5 mg of AIBN initiator, 0.5% by weight with respect to total monomer, was dissolved in the solution. The solution was mixed thoroughly on a vortex shaker before being placed in a temperature controlled ethylene glycol/water bath at 60° C. overnight, for about 16 hr. After heating, the solution was transparent, suggesting that the homopolymer produced was soluble in DMF. Precipitation of the homopolymer was done by adding the reaction solution dropwise to excess diethyl ether in a screw-capped vial. The white precipitate was collected by centrifugation at 2900 RPM for 15 min, followed by removal of the diethyl ether by pipette. The isolated polymer was then dried in a vacuum oven for 3-4 hr at 100° C. to remove remaining solvent. Size exclusion chromatography analysis gave an Mn of 9.360 Da and an Mw of 27,950 Da.

Example 39

Synthesis of Poly(ILBr) Homopolymer

ILBr (304 mg) was dissolved in 2.61 g DMF containing AIBN at 0.1% by weight in a small culture tube and placed in a bath at 60° C. overnight. The polymer was recovered by precipitating in diethyl ether and drying in a vacuum oven.

Example 40

Synthesis of poly(ILBr$_{80}$-co-MMA$_{20}$)

ILBr (250 mg) and MMA (61 mg) were dissolved in 2.6 g DMF containing AIBN at 0.1% by weight in a small culture tube and placed in a bath at 60° C. overnight. The polymer was recovered by precipitating in diethyl ether and drying in a vacuum oven.

Example 41

Synthesis of poly(ILBr$_{75}$-co-MMA$_{25}$)

ILBr (225 mg), MMA (75 mg), and AIBN (1.5 mg) were dissolved in 2.7 g DMF and the mixture was processed as in Example 40. Size exclusion chromatography analysis gave an Mn of 9.340 Da and an Mw of 55,250 Da.

Example 42

Synthesis of poly(ILBr$_{60}$-co-MMA$_{40}$)

ILBr (180 mg), MMA (120 mg), and AIBN (1.5 mg) were dissolved in 2.7 g DMF and the mixture was processed as in Example 40. Size exclusion chromatography analysis gave an Mn of 4,720 Da and an Mw of 109,500 Da.

Example 43

Synthesis of poly(ILBr$_{60}$-co-MMA$_{40}$)

ILBr (175 mg) and MMA (130 mg) were dissolved in 2.75 g DMF containing AIBN at 0.1% by weight in a small culture tube and placed in a bath at 60° C. overnight. The polymer was recovered by precipitating in diethyl ether and drying in a vacuum oven.

Example 44

Synthesis of poly(ILBr$_{50}$-co-MMA$_{50}$)

ILBr (150 mg), MMA (150 mg), and AIBN (1.5 mg) were dissolved in 2.7 g DMF and the mixture was processed as in Example 40. Size exclusion chromatography analysis gave an Mn of 35,390 Da and an Mw of 116,000 Da.

Example 45

Synthesis of poly(ILBr$_{40}$-co-MMA$_{60}$)

ILBr (118 mg) and MMA (185 mg) were dissolved in 2.7 g DMF containing AIBN at 0.1% by weight in a small culture tube and placed in a bath at 60° C. overnight. The polymer was recovered by precipitation in diethyl ether and drying in a vacuum oven.

Example 46

Synthesis of poly(ILBr$_{20}$-co-MMA$_{80}$)

ILBr (60 mg), MMA (240 mg), and AIBN (1.5 mg) were dissolved in 2.7 g DMF and the mixture was processed as in Example 40. Size exclusion chromatography analysis gave an Mn of 20,900 Da and an Mw of 89,600 Da.

Example 47

Synthesis of poly(ILBF4)

ILBr (60 mg), MMA (240 mg), and AIBN (1.5 mg) were dissolved in 2.7 g DMF and the mixture was processed as in Example 38. Size exclusion chromatography analysis gave an Mn of 20,900 Da and an Mw of 89,600 Da.

Example 48 to Example 50

Synthesis of Poly(ILBr) Homopolymer

The ionic liquid monomer ILBr was radically polymerized in water with VA-086 initiator (2,2'-azobis[2-methyl-N-(2-hydroxyethyl)-propionamide]; available from Wako, used as received) according to the following procedure. For each example 5 g of ILBr was dissolved in 100 g of water and placed in a CPA200 reaction calorimeter (ChemiSens AB, Lund, Sweden). Initiator level and temperature were varied to make different embodiments. For Example 48, 250 mg of VA-086 were added and the reaction temperature was maintained at 90° C.; for Example 49, 125 mg of VA-086 were added and the reaction temperature was maintained at 67° C.; for Example 50, 125 mg of VA-086 were added and the reaction temperature was maintained at 90° C. After ultrafiltration of the polymerization mixture through a membrane with 5 kDa cut-off, the poly(ILBr) homopolymer was isolated in a lyphoilizer. Molecular weights obtained by size exclusion chromatography in hexafluoro-2-propanol and by analytical ultracentrifugation are listed in Table 1.

TABLE 1

| Molecular weights of poly(ILBr) homopolymers | | | |
|---|---|---|---|
| Dispersion | $M_n$ (Da) | $M_w$ (Da) | AUC (Da) |
| Example 48 | 55,800 | 369,000 | 60,000 |
| Example 49 | 78,500 | 250,000 | 250,000 |
| Example 50 | 33,600 | 144,000 | 77,000 |

Example 51 to Example 72

Solution Block Copolymeric Ionic Liquid-Based Stabilizers

The following examples illustrate block copolymeric ionic liquid-based stabilizers according to the disclosure formed by solution polymerization (e.g., atom transfer radical polymerization).

Example 51

Macroinitiator I

Figure 3:
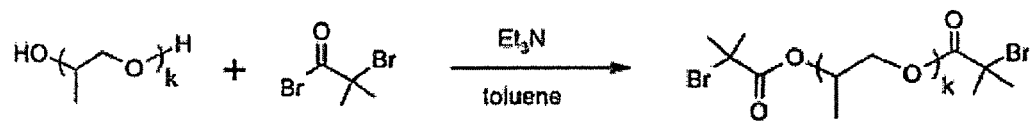
FIG. 3 illustrates a macroinitiator reaction scheme.

Macroinitiators for producing triblock copolymer stabilizers were prepared according to the Macroinitiator Scheme illustrated in FIG. 3. For the preparation of Macroinitiator I with k=17, poly(propylene oxide) with a Mn~1000 (17 repeating units) and hydroxyl value of 111 mg KOH/g (8.0 g, 8 mmol) was dissolved in 120 mL anhydrous toluene. After azeotropic distillation of ~20 mL of toluene by rotary evaporator to remove traces of water, triethylamine (2.43 g, 24 mmol) was added, and the mixture was cooled to 0° C. in an ice-water bath. In an argon atmosphere, 2-bromoisobutyryl bromide (BiBB) (5.52 g, 24 mmol) in 30 mL toluene was added dropwise over 50 min to the reactor. The reaction mixture was stirred for 24 hours at room temperature. After filtration, the filtrates were evaporated to remove most of the solvent (~20 mL left) on a rotary evaporator. The residue was dissolved in 120 mL methylene chloride and extracted with saturated NaHCO$_3$ solution (3×50 mL). The organic phase was then dried over anhydrous NaSO$_4$ and the solvent was removed using a rotary evaporator. The product was further dried in vacuo at 90° C. for 3 hours to give a brown viscous liquid abbreviated as Br—PO$_{17}$—Br (I). A yield of. 10.4 g (100%) was obtained. $^1$H NMR indicated that the degree of esterification was complete.

Example 52

Macroinitiator II

For the preparation of Macroinitiator II, Br—PO$_{60}$—Br, a similar procedure as described for Macroinitiator I was followed, except that the poly(ethylene oxide) used had a Mn~3500 (60 repeating units).

Example 53

Synthesis of TBI (k=17; n~7-70)

Figure 4:
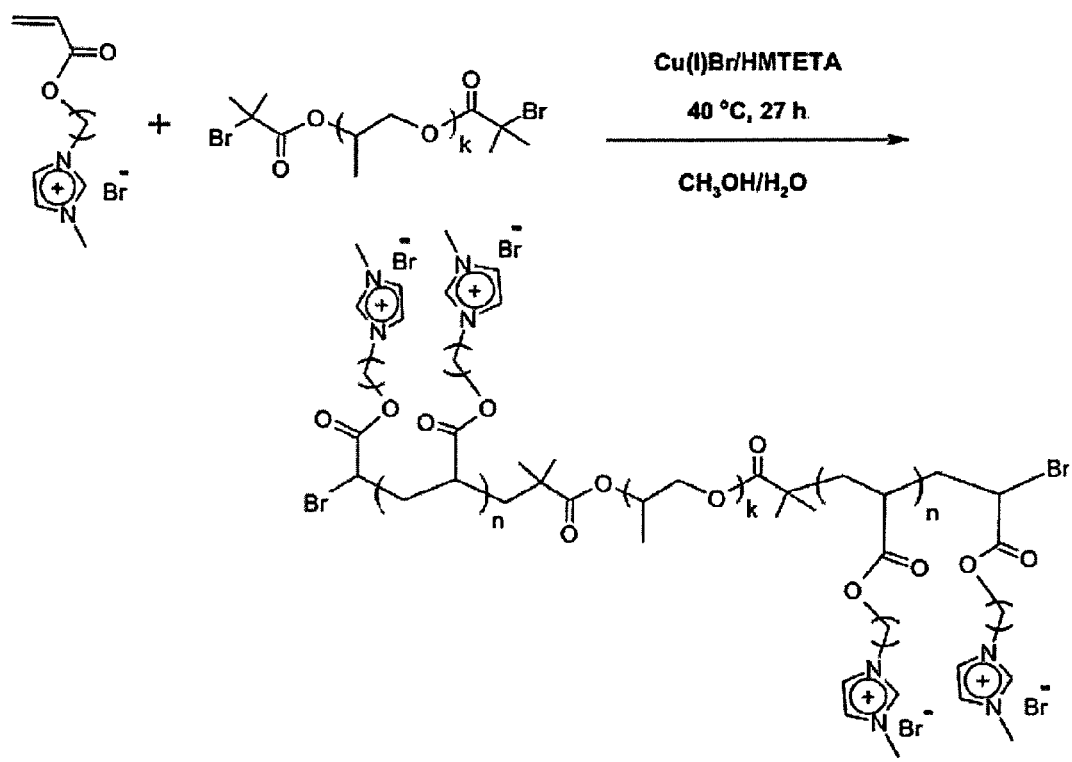
FIG. 4 illustrates an ATRP reaction scheme.

The ATRP Reaction Scheme of FIG. 4 was followed in preparing triblock copolymer stabilizers. Macroinitiator I was added to a flask with argon pre-saturated methanol and water (maintained at a volume ratio of 13:8.5), followed by the addition of Cu(I) Br. This solution was bubbled with argon for 5 minutes. ILBr monomer was then added and bubbling was continued for 8 minutes. Ligand (HMTETA) was last added to the flask by micropipette followed by an additional 3 minutes bubbling. The reaction flask was installed with a condenser connected with an argon balloon and a vacuum inlet. Vacuum-argon cycling was performed for 10 minutes and the flask was immersed in a preheated oil bath at 40° C. The polymerization was terminated by purging air into the reaction. After polymerization, the solution was dialyzed against water in SNAKESKIN Pleated Dialysis Tubing (MWCO 3500). Dialysis was done for two days with water changes 3 times a day. Purified polymers were recovered by lyophilization and dried in vacuo. Size exclusion chromatography analysis gave an Mn of 7,560 Da and an Mw of 58,200 Da.

Example 54

Synthesis of TBII (k=60; n~17-60)

The ATRP Reaction Scheme (FIG. 4) and procedure described for Example 53 was followed, except that Macroinitiator II was used. Size exclusion chromatography analysis gave an Mn of 17,800 Da and an Mw of 52,000 Da.

Example 55

Synthesis of IBM (k=60; n~21-32)

The procedure described for Example 54 was followed using Macroinitiator II. Size exclusion chromatography analysis gave an Mn of 21,000 Da and an Mw of 37,200 Da.

Example 56

Synthesis of TBIV (k=17; n~15-21)

The procedure according to the ATRP Reaction Scheme in Example 53 was followed using a mmol ratio of 12.9:1.29:2.58:1.29 of ILBr, CuBr, HMTETA, and Macroinitiator I, respectively. A total solvent volume of 52.5 mL was used with methanol:water in a volume ratio of 2.5:1. The CuBr and ligand were dissolved in a portion of the solvent and degassed with Ar bubbled through a methanol/water mixture identical to the reaction in a Schlenk flask. The macroinitiator and monomer were dissolved and similarly degassed in a separate flask. After all components were dissolved and both solutions were degassed, the Schlenk flask containing catalyst was placed in a bath at 40° C. The monomer/macroinitiator solution was then syphoned into the Schlenk flask through a stainless steel cannula, and the reaction was continued for about 48 h. The reaction was quenched by cooling to room temperature and bubbling air through the reaction. The reaction was then dialyzed for two days against deionized water, and then lyophilized and dried in vacuo. A yield of 19.4% was obtained (1.37 g). Size exclusion chromatography analysis gave an Mn of 7,400 Da and an Mw of 9,770 Da.

Example 57

Synthesis of TBV (k=17; n~14-19)

The procedure of Example 56 was followed using the same amounts of all components. A yield of 34.9% was obtained (2.51 g). Size exclusion chromatography analysis gave an Mn of 6,900 Da and an Mw of 8,970 Da.

Example 58

Synthesis of TBVI (k=17; n~18-35)

The procedure of Example 56 was followed using the twice the amount of all components. A mmol ratio of 25.8:2.58:5.16:2.58 of ILBr, CuBr, HMTETA, and Macroinitiator I, respectively, and a total solvent volume of 105 mL was used with methanol:water in a volume ratio of 2.5:1. In addition, the monomer and macroinitiator solution was transferred into the heated Schlenk flask more quickly, using a syringe. A yield of 62.7% was obtained (9 g). Size exclusion chromatography analysis gave an Mn of 8,600 Da and an Mw of 15,000 Da.

Example 59

Synthesis of TBVII (k=17; n~23-29)

The procedure of Example 56 was followed except that a mmol ratio of 12.9:0.43:0.86:0.43 of ILBr, CuBr, HMTETA, and Macroinitiator I were used, respectively, and the monomer/macroinitiator solution was transferred into the heated reaction (Schlenk) flask using a syringe. A yield of 48.7% was obtained (2.8 g). Size exclusion chromatography analysis gave an Mn of 10,400 Da and an Mw of 12,700 Da.

Example 60

Synthesis of TBVIII (k=17; n~25-31)

The procedure of Example 59 was followed except that a mmol ratio of 25.8:0.86:1.72:0.86 of ILBr, CuBr, HMTETA, and Macroinitiator I were used, respectively, a total volume of 37 mL of 2.5:1 methanol/water was used, and the reaction time was 27 h. A yield of 59.3% was obtained (6.8 g). Size exclusion chromatography analysis gave an Mn of 11,300 Da and an Mw of 13,600 Da.

Example 61

Synthesis of TBIX (k=60; n~23-39)

The procedure of Example 57 was followed except that Macroinitiator II was used. A yield of 58.6% was obtained (5.8 g). Size exclusion chromatography analysis gave an Mn of 12,800 Da and an Mw of 16,900 Da.

Example 62 to Example 63

Synthesis of DBI and DBII [poly(NIPAM-co-ILBr)]

[From K. Tauer, N. Weber, and J. Texter, *Chem. Comm.*, 6065-6067 (2009); doi:10.1039/B912148J.] Diblocks were synthesized by free radical chain polymerization. Poly(ILBr) blocks were first synthesized using a thermal initiator (2,2'-azobis[2-methyl-N-(2-hydroxyethyl)-propionamide]) that was done at 70° C. (Example 62) and at 90° C. (Example 63) to produce short and longer poly(ILBr) blocks, respectively, keeping the respective monomer amounts the same. A redox initiator comprising $Ce^{4+}$ that produces a radical on the α-methylene group adjacent the hydroxyl group in the presence of N-isopropylacrylamide (NIPAM) was used to grow the poly (NIPAM) block. The concentration of the $Ce^{4+}$ oxidant was chosen so that mainly one side of the homopolymer was initiated. [Topp, M. D. C., Leunen, I. H., Dijkstra, P. J., Tauer, K., Schellenberg, C., and Feijen, J., *Macromolecules* 33, 4986-4988 (2000); Tauer, K. and Khrenov, V., *Macromol. Symp.* 179, 27-52 (2002)]. The water soluble precursor polymer and NIPAM monomer (added at the about the same amount relative to the ILBr) were dissolved in $H_2O$ and equilibrated to the polymerization temperature. The polymerization was started by adding ceric ammonium nitrate (CAN, Fluka) dissolved in a proper amount of 1 M $HNO_3$. The diblock with the shorter poly(ILBr) block is denoted DBI (Example 62) and the one with a longer poly(ILBr) block as DBII (Example 63). Analytical ultracentrifugation indicated hydrodynamic molecular weights of 60 kDa and 250 kDa, respectively, for the diblocks DBI (Example 62) and DBII (Example 63). From $^1H$ NMR, the number ratio of NIPAM to ILBr units was about 1.8 for DBI and about 2.6 for DBII. The total molecular weights were estimated to be approximately 93 kDa for DBI and 450 kDa for DBII.

Example 64

Synthesis of DBIII [poly(NIPAM-co-ILBr)]

The procedure of Example 62 and Example 63 was used, except that the starting poly(ILBr) "macroinitiator" was the homopolymer described in Example 50, and the reaction temperature was 70° C. From $^1H$ NMR, the number ratio of NIPAM to ILBr units was about 2.3 for DBIII.

Example 65

Synthesis of TBX (poly(ILBr-co-NIPAM-co-MMA)

The procedure of Example 62 was followed in the preparation of DBI, except that MMA was added (approximately the same amount relative to the ILBr in the homopolymer synthesis of Example 48) to the reaction after nearly all of the NIPAM had reacted, and a third MMA block was added to make a di-stimuli responsive triblock copolymer TBX.

Example 66

Synthesis of TBXI (poly(ILBr-co-NIPAM-co-MMA)

The procedure of Example 63 was followed in the preparation of DBII, except that MMA was added (approximately the same amount relative to the ILBr in the homopolymer synthesis of Example 49) to the reaction after nearly all of the NIPAM had reacted, and a third MMA block was added to make a di-stimuli responsive triblock copolymer TBXI.

Example 67

Synthesis of TBXII
(poly(ILBr-co-NIPAM-co-MMA)

The procedure of Example 63 was followed in the preparation of DBII, except that MMA was added (approximately the same amount relative to the ILBr in the homopolymer synthesis of Example 50) to the reaction after nearly all of the NIPAM had reacted, and a third MMA block was added to make a di-stimuli responsive triblock copolymer TBXII.

Example 68

Synthesis of TBXIII (poly(ILBr-co-NIPAM-co-S)

The procedure of Example 62 was followed in the preparation of DBI, except that S (styrene) was added (approximately the same amount relative to the ILBr in the homopolymer synthesis of Example 49) to the reaction after nearly all of the NIPAM had reacted, and a third S block was added to make a di-stimuli responsive triblock copolymer TBXIII.

Example 69

Synthesis of PDMS Macroinitiator

A PDMS, polydimethylsiloxane, macroinitiator suitable for ATRP block copolymer synthesis was prepared by [following Macromol. Chem. Phys. 2010, 211, 1482-1487] combining dihydroxy-PDMS (33 mmol; $M_n$=35,000 g/mol), triethylamine (41.25 mmol) and THF (50 mL) a flask attached with an addition funnel. The whole system was purged with Ar and placed in an ice bath, and then 20 mL of THF and bromoisobutyryl bromide (41.25 mmol) were added using the addition funnel. The reaction was then stirred for 24 h, filtered, and a water/THF solution (10:30 ml) added. The THF and water were removed in vacuo, and the resulting oil was diluted in pentane and passed through a silica column. Removal of the pentane in vacuo provided the bifunctional PDMS macroinitiator.

Example 70 to Example 72

Synthesis of TBXIV to TBXVI (poly($ILBr_x$-$DMS_y$-$ILBr_x$)

Following Mespouille et al. [Eur. Polym J. 41 (2006) 1187-1195] one combines. 0.1 mmol of the PDMS macroinitiator from Example 69 with 2 mmol ILBr in 40 mL THF, and the solution is purged with Ar in a 100 mL Schlenk flask. A catalyst mixture of CuBr and HMTETA, 0.1 mmol and 0.2 mmol, respectively, in 20 mL THF in a round bottom flask with septum is purged with Ar and heated with stirring at 60° C. until the reaction solution becomes clear. This catalyst solution is then withdrawn by syringe and injected into the Schlenk flask, and the reaction is allowed to continue with stirring for 48 h. The reaction is stopped by purging with air. The product triblock TBXIV (Example 70), poly($ILBr_{10}$-$DM_{388}$-$ILBr_{10}$,), is washed with aqueous THF, aqueous diethyl ether, and then isolated by drying. The more hydrophilic triblock, TBV (Example 71), poly($ILBr_{20}$-$DMS_{388}$-$ILBr_{20}$), is prepared in the same manner, except that 4 mmol ILBr is combined with the macroinitiator and the CuBr and HMTETA are used at levels of 0.2 mmol and 0.4 mmol, respectively. Similarly, the most hydrophilic triblock, TBVI (Example 72), poly($ILBr_{30}$-$DMS_{388}$-$ILBr_{30}$), is prepared in the same manner, except that 6 mmol ILBr is combined with the macroinitiator and the CuBr and HMTETA are used at levels of 0.3 mmol and 0.6 mmol, respectively.

Example 73 to Example 230

Nanoparticle Dispersions with Ionic Liquid-Based Stabilizers

The following examples illustrate various aqueous nanoparticle dispersions including ionic liquid-based stabilizers according to the disclosure.

Example 73 to Example 75

Aqueous SWCNT/Nanolatex 2 Dispersions

The direct preparation of SWCNT nanolatex dispersions by mixing and joint ultrasonication is disclosed, resulting in well dispersed systems with SWCNT concentrations of about 0.5% by weight (w/w). This concentration is competitive with the most concentrated aqueous suspensions reported, and 5-100 fold more concentrated than previous disclosures about aqueous surfactant and polymer stabilization and dispersion studies previously reported. SWCNT (single wall carbon nanotube) samples were obtained commercially from Sigma-Aldrich and cleaned using standard nitric acid-based cleaning procedures to remove the metal catalyst particles. The cleaned SWCNT samples had the physical appearance of a shiny black powder. A small dispersion of cleaned SWCNT in the imidazolium-based Nanolatex 2 of Example 26 was prepared by adding 0.969 g of latex to about 5 mg of cleaned SWCNT. The Nanolatex 2 had been concentrated to about 18% (w/w) solids by ultrafiltration using an Amicon filtration module pressurized with nitrogen at about 25 psi. The SWCNT remained at the bottom of the mixture. The mixture was subjected to very mild ultrasonication, using a small ultrasonic cleaning bath. During the first 10 min of mild sonication at room temperature, the tightly bundled and shiny SWCNT solids expanded to a grey and fuzzy mass several times greater in apparent volume, indicating the onset of exfoliation. Then "streams" or "clouds" of locally concentrated SWCNT dispersion began flowing out of this mass into the bulk. A further 60 min of mild sonication resulted in a black dispersion (Example 73). After 12 days the dispersion had undergone some settling, with grey supernatant over top a more concentrated black suspension in the lower half of the volume. There was evidence of some sediment at the bottom when the vial was inverted. The same dispersion was next treated with intermediate power sonication for 1 min and turned over the volume by gently shaking to obtain what appeared to be a homogeneous black dispersion. An 180 W Branson sonifier was used with an approximately 5 mm diameter sonic horn fitted to the driver. The horn was inserted into a 100 mL beaker containing ice water. The dispersion sample vials were placed in the same bath, immediately adjacent to the horn, but the horn was not inserted into the dispersions directly. The sample was subjected to an identical 30 min of sonication at 60% of maximum power (Example 74). This intermediate level of sonication proved to be most effective. After standing for approximately one month there was no apparent sedimentation, although some of the water had evaporated, making the sample more concentrated and viscous at 1.37% (w/w) (Example 75). When the vial was inverted, there was no apparent sediment, indicating the sample was a "homogeneous" dispersion.

Example 76 to Example 85

Aqueous SWCNT/Nanolatex 2 Dispersions

Figure 5A:
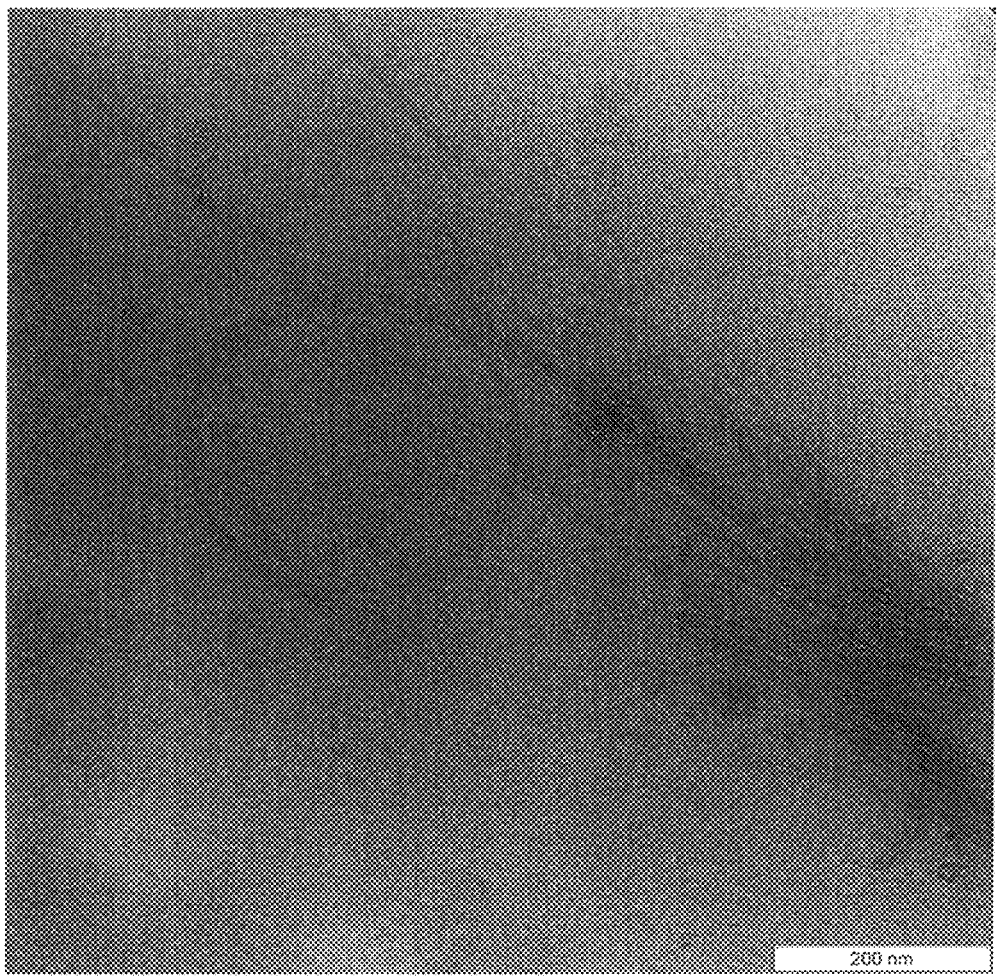
FIGS. 5a and 5b are transmission electron micrographs of SWCNTs dispersed in nanolatex after 840 s of cumulative dose (a: bundle of SWCNT undergoing exfoliation along with a coiled cluster of SWCNT undergoing exfoliation at the protruding ends (scale bar: 200 nm); b: high magnification of exfoliated SWCNT forming a film on drying (scale bar: 50 nm)).
Figure 5B:
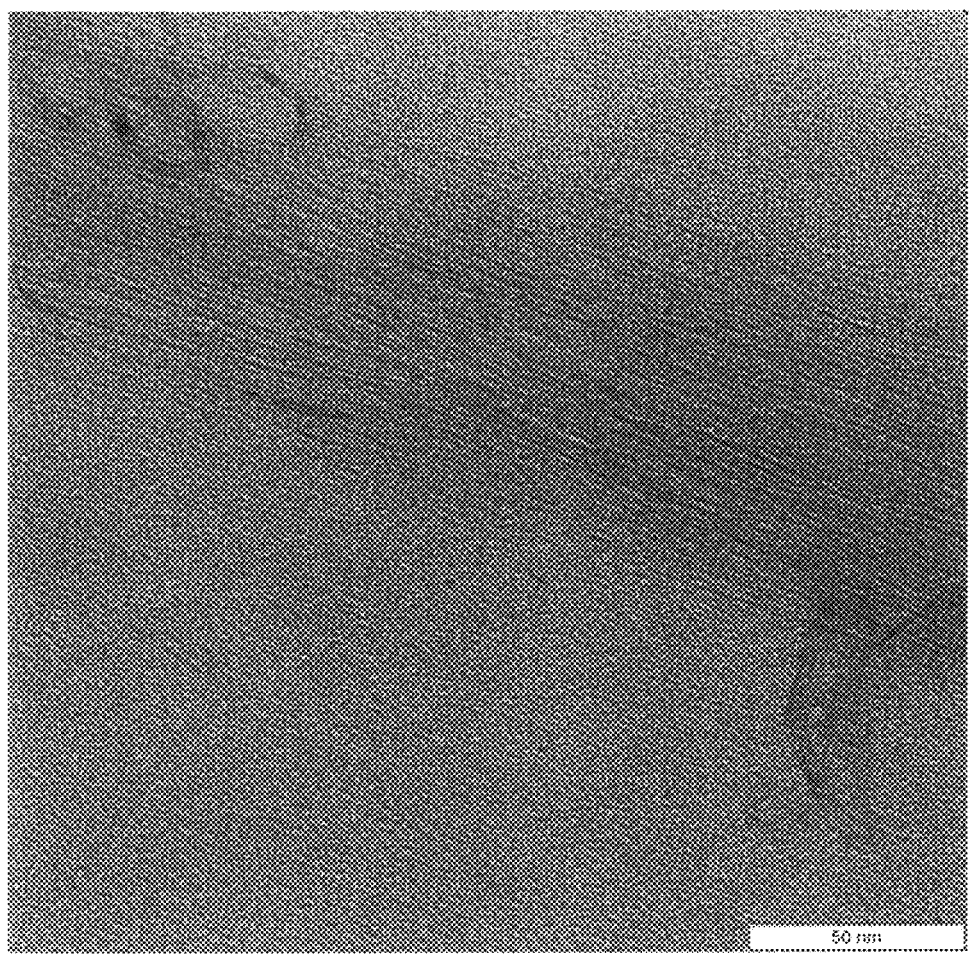

SWCNT were obtained and cleaned as described for Example 73 to Example 75. A dispersion of cleaned SWCNT was prepared in the same Nanolatex 2 by adding 3.98 g of nanolatex (14.5% solids) to 21.2 mg of cleaned SWCNT for a crude dispersion 0.527% in SWCNT. The SWCNT remained at the bottom of the mixture. The mixture was subjected to very mild ultrasonication for two minutes, using a small ultrasonic cleaning bath. The tightly bundled and shiny SWCNT solids expanded to a grey and fuzzy mass, indicating the onset of exfoliation. A regimen of more intense ultrasonication using a microtip immersed in the dispersion for various time intervals was initiated. After various cumulative dose times a drop of dispersion was taken, diluted, and the optical density at about 500 nm was measured by transmission visible absorption spectroscopy. The equivalent dispersion optical densities are illustrated in Table 2 and show that the degree of dispersion steadily increases with increasing sonication dose (treatment time). The sonication was stopped after 840 s so that two thin wafers of SWCNT nanolatex could be cast for further thermal an electrical conductivity measurements. A quantitative analysis indicates the degree of exfoliation of the SWCNT in the dispersion of Example 85 was on average about 56% of complete exfoliation. FIGS. 5a and 5b illustrate TEMs of the dispersed SWCNT obtained from the dispersion of Example 85.

TABLE 2

Dose-Optical Density Results for SWCNT/Nanolatex 2 Dispersions

| Dispersion | Dose (s) | OD (absorbance units per cm path length) |
|---|---|---|
| Example 76 | 0 | 2 |
| Example 77 | 15 | 3 |
| Example 78 | 30 | 5 |
| Example 79 | 60 | 7 |
| Example 80 | 120 | 23 |
| Example 81 | 240 | 25 |
| Example 82 | 360 | 42 |
| Example 83 | 480 | 52 |
| Example 84 | 600 | 64 |
| Example 85 | 840 | 84 |

Example 86 to Example 88

Aqueous MWCNT/Nanolatex 2 Dispersions

MWCNT were obtained from Bayer Advanced Material as a dry powder. The powder was briefly ground by hand in an agate mortar and pestle. The relatively mild and intermediate level and indirect horn sonication process used for Example 73 to Example 75 was used. Similar dispersions were prepared with. MWCNT contents of 0.399 (Example 86), 0.801 (Example 87), and 2.20% (w/w) (Example 88), using the same sequence of mild ultrasonic cleaning bath sonication and intermediate-indirect sonic horn sonication. Small amounts of each dispersion were diluted and measured optically at about 500 nm so that the equivalent/effective dispersion optical density could be calculated. Values, normalized to optical density absorbance units per cm pathlength per weight fraction, obtained were about 20,000, 21,000, and 18,000, respectively, for dispersions Example 86, Example 87, and Example 88. These dispersion did not appear to exhibit any significant sedimentation over a period of weeks.

Example 89 to Example 95

Aqueous MWCNT/Nanolatex 2 Dispersions

Using the same pre-ground MWCNT from Example 86 to Example 88 and Nanolatex 2 (about 18% w/w), a predispersion of 1% (w/w) was prepared in the Nanolatex 2, and sonicated in an ultrasonic cleaning bath for 60 min (Example 89). A small aliquot was removed to dilute and measure the effective optical density at 500 nm and then sonicated more forcefully with the 180 W Branson sonifier, but instead of indirectly sonicating as for Example 86 to Example 88, a micro-tip about 3.5 mm in diameter was fixed to the driver and placed directly in the dispersion. Doses for various times at 60% were applied, and effective dispersion optical densities were measured. The results are given in Table 3 for Example 89 to Example 95, where it can be seen that the effective optical density rises steeply, after an induction period, to an effective optical density in excess of 400. This 1% weight concentration corresponds to 10 mg/mL, and the 418 effective optical density means the MWCNT in this dispersion exhibits an extinction coefficient of 41.8 cm$^2$/mg. This is substantially greater than the 28.6 cm$^2$/mg value reported for completely exfoliated SWCNT [Bahr, et al., *Chem. Commun.* 2001, 193].

TABLE 3

Dose-Optical Density (500 nm) Results for MWCNT/Nanolatex 2 Dispersions

| Dispersion | Dose (s) | OD (absorbance units per cm path length) |
|---|---|---|
| Example 89 | 0 | 11 |
| Example 90 | 10 | 12 |
| Example 91 | 30 | 52 |
| Example 92 | 60 | 140 |
| Example 93 | 120 | 405 |
| Example 94 | 240 | 412 |
| Example 95 | 360 | 418 |

Example 96 to Example 105

Aqueous MWCNT/ILBr Dispersions

Pre-ground (mortar and pestle) MWCNT (BAYTUBES; obtained from Bayer Advanced Materials) was used to prepare an aqueous dispersion by combining 50.3 mg of MWCNT and 10.3 mg of with 4.94 g water in a vial and sonicating in an ultrasonic cleaning bath (mild sonication) for 60 min. This pre-dispersion is designated Example 96. The dispersion was then sonicated with a 180 W Delta sonifier in an ice water bath with a micro-tip (3.4 mm diameter) placed in the dispersion (strong sonication). Sonication was done for 10 min at 50% power, with 6W output (Example 97), and the effective optical density increased significantly. Results are summarized in Table 4. Next the power level of the strong sonication was increased, and optical density increased further, but only by a factor of less than two. The ILBr level was then doubled by adding another 8.2 mg of ILBr. Mild sonication to dissolve the added ILBr resulted in a substantial increase in effective optical density, as seen for Example 101. Further strong sonication raised the optical density to about 431 for Example 103. Addition of another 9.3 mg ILBr and strong sonication resulted in an effective optical density of about 606 for. Example 105. This level is, within experimental error, at the full exfoliation limit, and corresponds to an effective optical extinction of 60,600 OD/cm/weight fraction (0.01 or 1% w/w MWCNT). This type of dispersion of the invention is invaluable for creating films and composites, wherein the binder monomer is added after film formation, but is then free to polymerize through monomer already bound to the surfaces of the MWCNT (dispersed nanoparticles). Also, since the size of individual reactive surfactants like ILBr (~0.2 nm diameter×1 nm length) is much smaller than that of individual nanolatex particles (20-40 nm diameter), the resulting films and coatings should result in more tightly packed MWCNT (nanoparticles) with shorter and more conductive interconnections in the resulting networks.

TABLE 4

Dose-Optical Density (500 nm) Results for MWCNT/ILBr Dispersions

| Treatment | Dispersion | Cumulative Dose Strong Sonication (min) | OD (absorbance units per cm path length) |
|---|---|---|---|
| Mild sonication | Example 96 | 0 | 33 |
| Strong sonication; 50% amplitude; 6 W output | Example 97 | 10 | 74 |
| Strong sonication; 100% amplitude; 14-15 W output | Example 98 | 30 | 95 |
|  | Example 99 | 60 | 133 |
|  | Example 100 | 150 | 118 |
| Added 8.2 mg ILBr; 30 min mild sonication | Example 101 | 150 | 210 |
| Strong sonication; 100% amplitude; 14-15 W output | Example 102 | 180 | 368 |
|  | Example 103 | 240 | 431 |
| Added 9.3 mg ILBr; 30 min mild sonication; Strong sonication; 100% amplitude; 14-15 W output | Example 104 | 270 | 594 |
|  | Example 105 | 300 | 606 |

Example 106 to Example 114

Aqueous MWCNT/poly(ILBr) ILBr Dispersions

The method of Example 96 to Example 105 was used to prepare an aqueous dispersion by combining 49.3 mg of MWCNT and 11.3 mg of poly(ILBr) (Example 39) with 4.94 g water in a vial and sonicating in an ultrasonic cleaning bath (mild sonication) for 60 min. This pre-dispersion is designated Example 106. This dispersion was then treated with strong sonication and other modifications detailed sequentially in Table 5 for Example 106 to Example 114. The total poly(ILBr) level in Example 112 to Example 114 was (11.3 mg+5.3 mg=) 16.6 mg. The average optical density of 621 obtained in the last two examples Example 113 and Example 114 is, within experimental error, at the full exfoliation limit, and corresponds to an effective optical extinction of 62,200 OD/cm/weight fraction (0.01 or 1% w/w MWCNT). The stabilizer/MWCNT weight ratio for dispersion Example 110 to Example 112 was 16.6/49.3 or 34.6% relative to the MWCNT.

TABLE 5

Dose-Optical Density (500 nm) Results for MWCNT/poly(ILBr) Dispersions

| Treatment | Dispersion | Cumulative Dose Strong Sonication (min) | OD (absorbance units per cm path length) |
|---|---|---|---|
| Mild sonication | Example 106 | 0 | 26 |
| Strong sonication; 50% amplitude; 6 W output | Example 107 | 5 | 66 |
|  | Example 108 | 14 | 74 |
|  | Example 109 | 29 | 83 |
| Strong sonication; 100% amplitude; 14 W output | Example 110 | 49 | 104 |
|  | Example 111 | 89 | 124 |
| Added 5.3 mg poly(ILBr); 15 min mild sonication; Strong sonication; 100% amplitude; 14 W output | Example 112 | 119 | 365 |
| Strong sonication; 100% amplitude; 14 W output | Example 113 | 179 | 626 |
|  | Example 114 | 239 | 615 |

Example 115 to Example 122

Aqueous MWCNT/poly(ILBr80-co-MMA20) Dispersions

The method of Example 106 to Example 114 was used to prepare a series of aqueous dispersion of MWCNT using poly(ILBr$_{80}$-co-MMA$_{20}$) (Example 40) as the dispersion stabilizer. The amounts in the first predispersion were 5.04 g water, 50.6 mg MWCNT, and 9.8 mg poly(ILBr$_{80}$-co-MMA$_{20}$). The treatment regimen exfoliation results are detailed in Table 6. Beginning with dispersion Example 120 the stabilizer level was increased 12.7 mg to a total of 22.5 mg. Dispersion Example 122 resulted in an effective optical density expected for a completely exfoliated MWCNT dispersion. The stabilizer/MWCNT weight ratio for dispersion Example 120 to Example 122 was 22.5/50.6 or 44.4% relative to the MWCNT.

TABLE 6

Dose-Optical Density (500 nm) Results for MWCNT/poly(ILBr80-co-MMA20) Dispersions

| Treatment | Dispersion | Cumulative Dose Strong Sonication (min) | OD (absorbance units per cm path length) |
|---|---|---|---|
| Mild sonication 60 min; Strong sonication; 50% amplitude; 6 W output | Example 115 | 5 | 77 |
| Strong sonication; 50% amplitude; 6 W output | Example 116 | 15 | 79 |
| | Example 117 | 30 | 75 |
| Strong sonication; 100% amplitude; 14 W output | Example 118 | 52 | 123 |
| | Example 119 | 92 | 150 |
| Added 12.7 mg poly(ILBr80-co-MMA20); 15 min mild sonication; Strong sonication; 100% amplitude; 15 W output | Example 120 | 122 | 365 |
| Strong sonication; 100% amplitude; 16 W output | Example 121 | 152 | 516 |
| | Example 122 | 212 | 606 |

Example 123 to Example 130

Aqueous MWCNT/poly(ILBr60-co-MMA40) Dispersions

The method of Example 106 to Example 114 was used to prepare a series of aqueous dispersion of MWCNT using poly(ILBr$_{60}$-co-MMA$_{40}$) (Example 43) as the dispersion stabilizer. The amounts in the first predispersion were 4.94 g water, 53.4 mg MWCNT, and 10.2 mg poly(ILBr$_{60}$-co-MMA$_{40}$). The treatment regimen exfoliation (optical density) results are detailed in Table 7. Beginning with dispersion Example 130 the stabilizer level was increased 6.4 mg to a total of 16.6 mg. Dispersion Example 130 exhibited an effective optical density expected for a completely exfoliated MWCNT dispersion. The stabilizer/MWCNT weight ratio for dispersion Example 130 was 16.6/53.4 or 31.0% relative to the MWCNT.

TABLE 7

Dose-Optical Density (500 nm) Results for MWCNT/poly(ILBr$_{60}$-co-MMA$_{40}$) Dispersions

| Treatment | Dispersion | Cumulative Dose Strong Sonication (min) | OD (absorbance units per cm path length) |
|---|---|---|---|
| Mild sonication 60 min | Example 123 | 0 | 32 |
| Strong sonication; 50% amplitude; 6 W output | Example 124 | 5 | 84 |
| | Example 125 | 15 | 114 |
| | Example 126 | 30 | 140 |
| Strong sonication; 100% amplitude; 14 W output | Example 127 | 50 | 221 |
| | Example 128 | 90 | 298 |
| | Example 129 | 120 | 353 |
| Added 6.4 mg poly(ILBr80-co-MMA20); 15 min mild sonication; Strong sonication; 100% amplitude; 14 W output | Example 130 | 150 | 616 |

Example 131 to Example 138

Aqueous 0.5% (w/w) MWCNT/Nanolatex 2 Dispersion Optimization

A Nanolatex 2 dispersion 14.6% solids (w/w) was use to prepare various dilutions of Nanolatex 2 to a total weight of about 10 g. Then about 50 mg of MWCNT were added to this Nanolatex 2 dispersion, and the mixture was shaken on a vortex mixer for two min, and then sonicated in an ultrasonic cleaning bath for 1 h. The mixtures were then subjected to strong sonication at 50% amplitude for a given time and then subjected to 100% amplitude sonication for a given sequence of time periods, using a microtip, 3-4 mm diameter, sonic horn. After an asymptotic effective optical density was reached, treatment was stopped. Results are given in Table 8, where the net Nanolatex 2 solids to MWCNT solids weight ratio and effective optical density obtained are listed. The Cumulative Dose column lists the total time the sample dispersion was sonicated at 50% peak amplitude and at 100% amplitude. When these optical data vs. weight ratio data are plotted, they show clearly how much Nanolatex 2 is required to obtain an aqueous MWCNT dispersion wherein the MWCNT are completely exfoliated, one from another (about 0.21 at 0.5% MWCNT stabilized by Nanolatex 2). If one scales the asymptotically obtained effective optical density for the dispersion, in this case by multiplying by 200 (1/0.005), one obtains a value of about 54,000, close to the range expected (50,000 to 60,000) for complete MWCNT exfoliation.

TABLE 8

Dose-Optical Density (500 nm) Results for MWCNT/Nanolatex 2 Dispersions - 0.5% (w/w) MWCNT

| | Stabilizer/CNT Weight Ratio | Cumulative Dose (min) 50%/100% | OD (abs units per cm) |
|---|---|---|---|
| Example 131 | 0 | 40/210 | 51 |
| Example 132 | 0.1 | 40/140 | 81 |
| Example 133 | 0.15 | 40/340 | 179 |
| Example 134 | 0.18 | 40/260 | 246 |
| Example 135 | 0.3 | 40/160 | 264 |
| Example 136 | 0.6 | 40/160 | 266 |
| Example 137 | 1.3 | 40/160 | 265 |
| Example 138 | 2.0 | 40/160 | 271 |

Example 139 to Example 146

Aqueous 1% (w/w) MWCNT/Nanolatex 2 Dispersion Optimization

The stabilizer optimization process followed for Example 131 to Example 138 was followed to determine the minimum stabilizer needed to completely disperse (exfoliate) and stabilize MWCNT in water at a concentration of 1% (w/w). About 100 mg of MWCNT were added to each example. Details are presented in Table 9. When these optical data vs. weight ratio data are plotted, the two asymptotes intersect and indicate a minimum weight ratio of about 0.25 of Nanolatex 2 to MWCNT is needed to completely exfoliate (stabilize) the MWCNT in water. If one scales the asymptotically obtained effective optical density for the dispersion, in this case by multiplying by 100 (1/0.01), one obtains a value of about 54,000, close to the range expected (50,000 to 60,000) for complete MWCNT exfoliation.

TABLE 9

Dose-Optical Density (500 nm) Results for MWCNT/Nanolatex 2 Dispersions - 1.0% (w/w) MWCNT

| | Stabilizer/CNT Weight Ratio | Cumulative Dose (min) 50%/100% | OD (abs units per cm) |
|---|---|---|---|
| Example 139 | 0 | 40/160 | 50 |
| Example 140 | 0.15 | 40/220 | 261 |
| Example 141 | 0.19 | 40/230 | 385 |
| Example 142 | 0.23 | 40/160 | 522 |
| Example 143 | 0.3 | 40/160 | 539 |
| Example 144 | 0.6 | 40/160 | 550 |
| Example 145 | 1.2 | 40/160 | 543 |
| Example 146 | 2.4 | 40/160 | 541 |

Example 147 to Example 156

Aqueous 2% (w/w) MWCNT/Nanolatex 2 Dispersion Optimization

The stabilizer optimization process followed for Example 131 to Example 138 was followed to determine the minimum stabilizer needed to completely disperse (exfoliate) and stabilize MWCNT in water at a concentration of 2% (w/w). About 200 mg of MWCNT were added to each example. Details are presented in Table 10. When these optical data vs. weight ratio data are plotted, the two asymptotes intersect and indicate a minimum weight ratio of about 0.29 of Nanolatex 2 to MWCNT is needed to completely exfoliate (stabilize) the MWCNT in water. If one scales the asymptotically obtained effective optical density for the dispersion, in this case by multiplying by 50 (1/0.02), one obtains a value of about 55,000, close to the range expected (50,000 to 60,000) for complete MWCNT exfoliation.

TABLE 10

Dose-Optical Density (500 nm) Results for MWCNT/Nanolatex 2 Dispersions - 2.0% (w/w) MWCNT

| | Stabilizer/CNT Weight Ratio | Cumulative Dose (min) 50%/100% | OD (abs units per cm) |
|---|---|---|---|
| Example 147 | 0 | 40/290 | 60 |
| Example 148 | 0.07 | 40/110 | 174 |
| Example 149 | 0.14 | 40/210 | 439 |
| Example 150 | 019 | 40/110 | 631 |
| Example 151 | 0.23 | 40/210 | 1036 |
| Example 152 | 03 | 40/110 | 1100 |
| Example 153 | 0.82 | 40/110 | 1081 |
| Example 154 | 1.25 | 40/150 | 1096 |
| Example 155 | 1.63 | 40/110 | 1112 |
| Example 156 | 2.0 | 40/125 | 1133 |

Example 157 to Example 167

Aqueous 4% (w/w) MWCNT/Nanolatex 2 Dispersion Optimization

The stabilizer optimization process followed for Example 131 to Example 138 was followed to determine the minimum stabilizer needed to completely disperse (exfoliate) and stabilize MWCNT in water at a concentration of 4% (w/w). About 400 mg of MWCNT were added to each example. Details are presented in Table 11. When these optical data vs. weight ratio data are plotted, the two asymptotes intersect and indicate a minimum weight ratio of about 0.3 of Nanolatex 2 to MWCNT is needed to completely exfoliate (stabilize) the MWCNT in water. If one scales the asymptotically obtained effective optical density for the dispersion, in this case by multiplying by 25 (1/0.04), one obtains a value of about 55,000, close to the range expected (50,000 to 60,000) for complete MWCNT exfoliation.

TABLE 11

Dose-Optical Density (500 nm) Results for MWCNT/Nanolatex 2 Dispersions - 4.0% (w/w) MWCNT

| | Stabilizer/CNT Weight Ratio | Cumulative Dose (min) 50%/100% | OD (abs units per cm) |
|---|---|---|---|
| Example 157 | 0 | 40/160 | 80 |
| Example 158 | 0.1 | 40/320 | 515 |
| Example 159 | 0.15 | 40/310 | 1052 |
| Example 160 | 0.2 | 40/110 | 1650 |
| Example 161 | 0.3 | 40/210 | 1850 |
| Example 162 | 0.47 | 40/110 | 2054 |
| Example 163 | 0.7 | 40/110 | 1081 |
| Example 164 | 1.0 | 40/i20 | 2043 |
| Example 165 | 1.5 | 40/110 | 2130 |
| Example 166 | 2.0 | 40/120 | 2300 |
| Example 167 | 2.5 | 40/125 | 1960 |

Example 168 to Example 170

Aqueous WC/Nanolatex 2 Dispersions

Nanocomposites of WC (tungsten carbide) and related compounds in flexible nanolatex films are envisioned as being useful as "paint on" thermal transfer media, "paint on" and fire hardening treatments, and "stretch on" cutting tool hardening materials. By "paint on" it is meant that the nanoparticle WC nanolatex dispersions can be painted on any suitable plastic or metal substrate by brushing, spraying, rolling, or other conventional low-energy coating method. By stretch on and fire it is meant that after coating a cutting surface with the nanoparticle WC nanolatex dispersion and allowing the dispersion to harden and dry, the organic phase is oxidized by firing the surface with a torch or other flame. By "stretch on" nanolatex dispersions of nanoparticle WC are envisioned that dry or harden to form flexible and elastic films. Such films can then be stretched over cutting tool surfaces, and then fired or simply put into service, the initial period of which will oxidize and dissipate the organic binder.

Tungsten carbide (WC) nanopowder was synthesized by using a new urea-glass route at relatively low temperature (700-800° C.) yielding WC nanoparticles assembled in aggregates and clusters [C. Giordano, C. Erpen, W. T. Yao, B. Milke, M. Antonietti, Nano Lett. 8 (2008) 4659; C. Giordano, C. Erpen, W. T. Yao, B. Milke, M. Antonietti, *Chem. Mater.* 21 (2009) 5136.]. The nanoparticles are derived from $WCl_4$ and WN to WC can be selected by picking the appropriate processing temperature.

A Nanolatex 2 dispersion similar to that used in Example 73 to Example 75 was used; it was about 18.6% solids. About 22 mg of WC nanopowder was weighed into each of two small vials (~4-5 mL with a plastic cap). About 4.1 g of 18.6% (w/w) Nanolatex 2 was then added to each vial, and the crude suspensions were vortexed. Dispersion Example 168 was sonicated for 120 s at 60% amplitude and dispersion Example 169 was sonicated for 300 s at 60% amplitude. Fairly black suspensions at 0.5% w/w WC were generated, although quite a bit of material did sediment overnight. Dispersion Example AA+96 was formulated with 90.2 mg of a similarly prepared fine-grain WC nanopowder and 2.98 g of Nanolatex 2 (18.5% solids) for a dispersion 3.03% WC by weight. For this Example 170, the nanopowder was first ground with an agate mortar and pestle. This dispersion was subjected to 300 s of sonication using a microtip at 50% amplitude. This dispersion did not appear to change appearance over four days, and only a very small amount of sedimentation was visible to the eye upon inverting the storage vial. This small amount of sediment appeared readily re-dispersed upon vibratory mixing for a few seconds. The resulting black dispersion, was diluted about 100-fold and yielded an average optical absorbance over the 900-400 nm interval of about 0.39. This implies that the dispersion as made was actinic where a 1 cm pathlength would yield an optical density of 39.4. This same dilution was used to prepare a sample for TEM analysis. The TEM illustrated image fields dotted with nanolatex particles either isolated or in small aggregates of two or three. "Inside" most of these latex "blotches" were seen one to many very small (down to 2 nm) black nanoparticles, the dispersed WC.

It is noteworthy that these are the first reported stable waterborne WC dispersions. These dispersions comprise the smallest dispersed and stabilized WC nanoparticles reported to date. The visible optical absorption density of dispersed WC nanoparticles in these dispersions is competitive with that for carbon in the carbon nanotube dispersions disclosed in the instant specification.

Example 171

Aqueous MWCNT/WC/Nanolatex 2 Dispersion

The WC-loaded Nanolatex dispersion of Example 170 is used to prepare an aqueous MWCNT dispersion, 4% (w/w) in MWCNT and 1.88% (w/w) in WC-loaded Nanolatex 2, as described in Example 162. Essentially complete exfoliation is achieved and the WC nanoparticles are bonded to the MWCNT via the Nanolatex 2 particles.

Example 172 to Example 230

Aqueous Hydrothermal Carbon Dispersions

The development of micro and nano hydrothermalcarbon dispersions is important as an alternative and sustainable source of synthetic coal and as fuel for low temperature indirect carbon fuel cells [Weibel, D. B.; Boulatov, R.; Lee, A.; Ferrigno, R.; Whitesides, G. M. *Angew. Chem. Int. Ed.* 2005, 44, 5682; Paraknowitsch, J. P.; Thomas, A.; Antonietti, M. *Chem. Mater.* 2009, 21, 1170.].

Five hydrothermal carbon (HTC) samples were provided by Dr. Magdalena Titirici of the Max Planck Institute of Colloids and Interfaces, Potsdam, Germany. These HTC samples were derived from carbohydrate as summarized in Table 12. Chitosan (medium molecular weight), D(+)-Glucose, Melamine, Furfural and D(+)-glucosamine hydrochloride (>99.0%, HPLC) were purchased from Sigma-Aldrich and used without further purification. Luvitec K60 (obtained from BASF) is a 34-36% by weight solution of polyvinylpyrrolidone (PVP) in water with a pH of 7-9 and less than 0.03% nonvolatile residue. Luvitec VPI 55 K72W (obtained from BASF) is a copolymer of vinyl pyrrolidone and vinyl imidazole.

TABLE 12

Hydrothermal Carbon Compositions

| HTC | Principal Component(s) | % C/% N | Pore Vol ($cm^3/g$) |
|---|---|---|---|
| HTC-1 | 10% Chitosan | 79.2/9.1 | 0.01 |
| HTC-2 | 10% Glucosamine | 81.6/6.6 | 0.04 |
| HTC-3 | 10% Glucose; 10% Melamine | 67.7/21.8 | 0.11 |
| HTC-4 | 10% Glucose, 2% K60 (BASF PVP) | 92.7/2.8 | 0.17 |
| HTC-5 | 10% Furfural; 10% 72W (BASF PVP/Polyvinylimidazole copolymer) | 83.9/8.8 | 0.01 |

These nitrogen-doped HTC samples were synthesized by combining 2 g of carbohydrate (Chitosan, D(+)-glucosamine hydrochloride) and 18 g of deionized water, mixing, and labeled as HTC-1 and HTC-2, respectively. HTC-3 is composed of 2 g of glucose, 2 g of melamine and 16 g of deionized water. Sample HTC-4 consists of 2 g of glucose, 0.4 g of the polymer K60 and 17.6 g of deionized water. Sample HTC-5 contains 2 g of furfural, 2 g of polymer 72W and 16 g of deionized water. The mixtures were sealed into glass vials inside PTFE inlets autoclaves followed by hydrothermal treatment at 180° C. overnight. After the reaction, the autoclaves were cooled down in a cold water bath, then the obtained black solid powder were filtered and washed with distilled water several times followed by drying in vacuum oven at 80° C. Afterwards, in order to improve the level of structural order, further high temperature (750° C.) treatment was performed in an oven under $N_2$ flow.

These HTC samples were ground in a mortar and pestle and mixed with Nanolatex 2 dispersion so that the net compositions were 2% (w/w) HTC and 16.9% (w/w) nanolatex. These pre-dispersion mixtures (10 g) were then mildly sonicated in an ultrasonic cleaning bath for about 60 min and then sonicated at 50% and 100% amplitude using a Sonics sonicator with a ⅛" microtip. The effective optical density of these dispersions with cumulative dose are given in Tables 13 (HTC-1), 14 (HTC-2), 15 (HTC-3), 16 (HTC-4), and 17 (HTC-5). The sample yielding the most intense optical density at 500 nm was the most porous of the five compositions. The asymptotic optical densities from Tables 13 to 17 increase in the order: HCT-1<HCT-5<HCT-2<HCT-3<HCT-4. The pore volumes from Table 12 increase in the same order: HCT-1≈HCT-5<HCT-2<HCT-3<HCT-4. It is believed, therefore, that the most finely divided dispersions of this sonication/stabilizer process will be the most porous, and porosity is a definite design objective to consider when formulating HTCs for dispersion related applications.

TABLE 13

Dose-Optical Density (500 nm) Results for HCT-1/Nanolatex 2 Dispersions - 2.0% (w/w) HCT

|  | Cumulative Dose (min) 50%/100% | OD (abs units per cm) |
|---|---|---|
| Example 172 | 0/0 | 15.7 |
| Example 173 | 2/0 | 19 |
| Example 174 | 4/0 | 18.9 |
| Example 175 | 8/0 | 21.3 |
| Example 176 | 15/0 | 19.4 |
| Example 177 | 22.5/0 | 20.7 |
| Example 178 | 30/0 | 21.5 |
| Example 179 | 30/2 | 23 |
| Example 180 | 30/4 | 22.8 |
| Example 181 | 30/8 | 22.9 |

TABLE 14

Dose-Optical Density (500 nm) Results for HCT-2/Nanolatex 2 Dispersions - 2.0% (w/w) HCT

|  | Cumulative Dose (min) 50%/100% | OD (abs units per cm) |
|---|---|---|
| Example 182 | 0/0 | 16.8 |
| Example 183 | 2/0 | 24.8 |
| Example 184 | 4/0 | 26.5 |
| Example 185 | 8/0 | 27.6 |
| Example 186 | 15/0 | 30.3 |
| Example 187 | 30/0 | 33.6 |
| Example 188 | 60/0 | 37.5 |
| Example 189 | 120/0 | 40.2 |
| Example 190 | 120/4 | 43.4 |
| Example 191 | 120/8 | 44.7 |
| Example 192 | 120/16 | 47.4 |
| Example 193 | 120/32 | 48 |

TABLE 15

Dose-Optical Density (500 nm) Results for HCT-3/Nanolatex 2 Dispersions - 2.0% (w/w) HCT

|  | Cumulative Dose (min) 50%/100% | OD (abs units per cm) |
|---|---|---|
| Example 194 | 0/0 | 42.2 |
| Example 195 | 2/0 | 54.3 |
| Example 196 | 4/0 | 58.9 |
| Example 197 | 8/0 | 67.1 |
| Example 198 | 15/0 | 74.7 |
| Example 199 | 30/0 | 87.3 |
| Example 200 | 60/0 | 105.1 |
| Example 201 | 120/0 | 115.4 |
| Example 202 | 120/2 | 117.8 |
| Example 203 | 120/4 | 120.1 |
| Example 204 | 120/8 | 126.9 |
| Example 205 | 120/16 | 126.6 |
| Example 206 | 120/32 | 126.9 |

TABLE 16

Dose-Optical Density (500 nm) Results for HCT-4/Nanolatex 2 Dispersions - 2.0% (w/w) HCT

|  | Cumulative Dose (min) 50%/100% | OD (abs units per cm) |
|---|---|---|
| Example 207 | 0/0 | 89 |
| Example 208 | 2/0 | 95.1 |
| Example 209 | 4/0 | 100 |
| Example 210 | 8/0 | 105.3 |
| Example 211 | 15/0 | 113.7 |
| Example 212 | 30/0 | 125.2 |
| Example 213 | 60/0 | 146.6 |
| Example 214 | 120/0 | 175.5 |
| Example 215 | 240/0 | 223.8 |
| Example 216 | 480/0 | 279.5 |
| Example 217 | 480/8 | 299.1 |
| Example 218 | 480/16 | 290.6 |
| Example 219 | 480/32 | 312.5 |

TABLE 17

Dose-Optical Density (500 nm) Results for HCT-5/Nanolatex 2 Dispersions - 2.0% (w/w) HCT

|  | Cumulative Dose (min) 50%/100% | OD (abs units per cm) |
|---|---|---|
| Example 220 | 0/0 | 22.2 |
| Example 221 | 2/0 | 23 |
| Example 222 | 4/0 | 23.8 |
| Example 223 | 8/0 | 24.1 |
| Example 224 | 15/0 | 24.5 |
| Example 225 | 30/0 | 25.2 |
| Example 226 | 30/5 | 25.3 |
| Example 227 | 30/9 | 26 |
| Example 228 | 30/17 | 27 |
| Example 229 | 30/33 | 27.6 |
| Example 230 | 30/65 | 28.9 |

Example 231 to Example 270

Films Formed from Nanoparticle Dispersions

The following examples illustrate various films formed from aqueous nanoparticle dispersions including ionic liquid-based stabilizers according to the disclosure.

Example 231 to Example 233

SWCNT/Nanolatex 2 Composite Films

A control film composed only of Nanolatex 2 was made by pouring about 1 g of nanolatex dispersion into a small cup provided by an annular ring 24.3 mm in diameter and 2.6 mm high within a polypropylene centrifuge tube cap; this annular ring created a cylindrical mold of approximately 1 mL volume and served to seal the cap/tube assembly when tightly screwed onto its matching centrifuge tube (not used in this example). The nanolatex film formed by drying overnight is Control Example 231. The aqueous SWCNT/Nanolatex 2 Dispersion of Example 75 was too viscous to efficiently make a cured film by the typical liquid processing steps, pouring and casting. It was therefore diluted with water to a 0.51% (w/w) concentration and subjected to intermediate sonication for 7 min, followed by gentle shaking to convectively mix, and followed by a final 5 min of sonication.

Two SWCNT/Nanolatex 2 Composite Films were prepared by pouring about 1 g of this SWCNT/Nanolatex 2 dispersion into each of two polypropylene molds. While the fluid did not spontaneously wet the entire interior surface of the annular cup, a copper wire was used to spread the sessile drop around to the unwetted areas, and after making contact, no dewetting occurred before or during drying. These castings dried overnight to give two shiny black films (Example 232 and Example 233), covering the interior bottom of the annular cup as well as the sidewalls of the cup and were about 3% by weight SWCNT after drying. The films were separated from the polypropylene molds by the mechanical stresses induced by cutting around the outer periphery of the annular cup. In both cases this operation produced sufficient stress to free the samples from the respective cups.

The samples were examined by dielectric spectroscopy, recording permittivity and dielectric loss, and conductivity spectra as a function of frequency over the 0.1 Hz to 10 MHz interval and from −50° C. to 100° C. The SWCNT nanolatex films of Example 232 and Example 233 were about 130 μm thick, and the nanolatex control film of Example 231 was about 180 μm thick. The conductivity results showed that the electrical conductivity from essentially zero frequency up to 100 kHz was due to electronic conductivity from −50° C. to 0° C. One can see a dramatic difference between the SWCNT latex film and the latex control film. Thermal diffusivity measurements also showed the SWCNT/Nanolatex 2 films (Example 232 and Example 233) had enhanced thermal conductivity relative to the nanolatex-only control (Example 231).

Example 234 to Example 235

SWCNT/Nanolatex 2 Composite Films

The SWCNT/nanolatex dispersion of Example 86 was then cast into two polypropylene 2.43 cm inner diameter molds (877 mg in one, Example 234; and 892 mg in the other, Example 235) as done in Example 231 to Example 233 and allowed to dry at ambient over night. Each dried to give a shiny black upper surface and dull black lower surface. These latex films were then separated from the polypropylene molds by the mechanical stresses induced by cutting around the outer periphery of the annular cup. These films, approximately 150-200 μm thick, were used for thermal and electrical conductivity measurements.

Thermal diffusivity at 25° C. was determined by using a xenon flash instrument. The results are listed in Table 18 for both through-plane (⊥) and in-plane (∥•) geometries. The nanolatex control film has an isotropic thermal diffusivity $\alpha$=0.085 mm$^2$/s. The corresponding thermal conductivity $k=\alpha \cdot \rho \cdot C_p$=0.144 W/m/K ($\rho$=1.19 g/cm$^3$; $C_p$=1.425 J/g/K) is typical of many polymers and latex films [Holman, J. P.; *Heat Transfer*, 9th Ed., McGraw-Hill, New York, 2002; Cai, D.-Y.; Song, M. *Macromol. Chem. Phys.* 2007, 208, 1183-1189]. These films, made by casting, have a SWCNT content of 3.5% w/w after drying. The through-plane thermal diffusivity and thermal conductivity were each increased about 50% relative to the control film without SWCNT (Example 231). This magnitude of increase appears novel when compared to SWCNT latex composites, where only a 7-10% increase was reported with 3% SWCNT [Grunlan, J. C.; Kim, Y.-S.; Ziaee, S.; Wei, X.; Abdel-Magid, B.; Tao, K. *Macromol. Mat. Eng.* 2006, 291, 1035-1043] and the cause for the small effect was attributed to large thermal interface resistance also referred to as interfacial phonon scattering.

An in-plane thermal diffusivity of 1.086 mm$^2$/s for the film of Example 234 shows that our use of a nanolatex allows the SWCNT to template the anisotropy. The through-plane diffusivity was 0.123 mm$^2$/s. This 8.8 fold anisotropy in thermal diffusivity and thermal conductivity was produced by drying and not by any rheological orienting force, although such forces are commonly encountered in many coating and spinning processes. The room temperature anisotropy of 8.8 can be compared with that for pyrolytic graphite of 47. The in-plane thermal conductivity of 1.83 W/m/K is a very respectable value in view of the intrinsic value of 210 W/m/K obtained for oriented SWCNT. The 3.5% w/w corresponds to a volume fraction of only 2.5%. The theoretical in-plane conductivity for fully aligned and dispersed SWCNT is (0.975·0.144+0.025·210=) 5.39 W/m/K. This film, therefore, exhibits an in-plane thermal conductivity about 34% of the maximum achievable at a volume fraction of 0.025. Through-plane and in-plane electrical conductivities were also measured for the same film at 25° C. and at 44% rh using a Solaratron-based impedance spectroscopy system. The in-plane measurements utilized a four-probe technique. A through-plane conductivity of 0.011 mS/cm was obtained and in-plane values of 0.135 mS/cm and 0.110 mS/cm were obtained for the shiny and dull surfaces, respectively, of the film. The shiny black side was the upper surface that dried in contact with air, and the dull black side is the side that contacted the polypropylene mold during drying. An electrical conductivity an isotropy of 10-15 was observed.

Example 236 to Example 239

MWCNT/Nanolatex 2 Composite Films

The dispersions of Example 86, Example 87, Example 88, and Example 95 were used to make thin film castings as described for the SWCNT/nanolatex composite Example 231 to Example 233. The inner annular seal of 50 mL centrifuge tube caps were used as polypropylene molds to make air-dried wafers. Each annular ring holds about 850-950 mg of dispersion. The resulting films were analyzed for electrical conductivity and thermal diffusivity, and the results are shown in Table 18.

TABLE 18

Through-Plane Electrical Conductivity ($\sigma$) and Thermal Diffusivity (D) for MWCNT/Nanolatex 2 Composite Films/Coatings at 25° C.

| Film/Coating | Weight % MWCNT in Dispersion/Film | Log $\sigma$/(mS/cm) | D/(mm$^2$/s) |
|---|---|---|---|
| Example 231 | 0/0 | −2.7 | 0.085 |
| Example 236 | 0.399/2.2 | −2.9 | 0.12 |
| Example 237 | 0.801/4.3 | −1.6 | 0.133 |
| Example 238 | 2.2/10.9 | 0.4 | 0.196 |
| Example 239 | 1.0/5.3 | −1.2 | 0.145 |

The 0% control values were derived directly from the nanolatex dispersion and film of Example 231. The thermal diffusivity values fit a smooth curve and steadily increase with increasing MWCNT loading. The 0.123 mm$^2$/s datum from a similar thin wafer derived from a nanolatex/SWCNT dispersion coating, Example 234, falls directly upon this same line. The wafer at 1.00% w/w MWCNT also exhibited an in-plane thermal diffusivity of 1.10 mm$^2$/s, indicating an anisotropy for thermal diffusion and conductivity of about 8. This anisotropy indicates a significant alignment of the MWCNT parallel to the in-plane direction resulting during the drying/curing process.

Example 240

MWCNT/Nanolatex 2 Composite Membrane

An aqueous MWCNT/Nanolatex 2 dispersion 4% (w/w) MWCNT and 1.25% nanolatex 2 was prepared using the sonication methods of Example 130 so that the MWCNT were essentially completely exfoliated. This dispersion was then used to prepare a MWCNT membranes supported on highly porous mulberry paper. The mulberry paper substrates were placed on top of some porous Magician's paper (flash paper) and the MWCNT dispersions were applied with a drawdown bar having a 25-mil slot. A coverage of 0.14 mg MWCNT/cm² was estimated. Through-plane (⊥) and in-plane (∥) electrical conductivities were measured; results are listed in Table 19.

Example 241 to Example 243

MWCNT/Nanolatex 2 Composite Membranes

An aqueous MWCNT/Nanolatex 2 dispersion 4% (w/w) MWCNT and 2.5% nanolatex 2 was prepared using the sonication methods of Example 130 so that the MWCNT were essentially completely exfoliated. This dispersion was then used to prepare a series of MWCNT membranes supported on highly porous mulberry paper. The mulberry paper substrates were placed on top of some porous Magician's paper (flash paper) and one to four layers of MWCN dispersion were applied with a drawdown bar having a 25-mil slot. Membrane Example 241 received one coat (resulting surface density of 0.2 mg MWCNT/cm²), membrane Example 242 received 2 coats (2 mg MWCNT/cm²), and membrane Example 243 received 4 coats (3 mg MWCNT/cm²). Through-plane (⊥) and in-plane (∥) electrical conductivities were measured; results are listed in Table 19. The extremely high thermal diffusivity exhibited by the membrane Example 241 and Example 242 results in an estimate of about 0.84 to 1 kW/m/K for the thermal conductivity (using a measured density of 0.8 and an effective heat capacity of 0.7).

TABLE 19

Electrical Conductivity (σ) and Thermal Diffusivity (D) for MWCNT/Nanolatex 2 Supported Membranes at 25° C.; through-plane (⊥) and in-plane (∥)

| Film/Coating | MWCNT (mg/cm²) | σ/(mS/cm) ⊥/∥ | D/(mm²/s) ⊥/∥ |
|---|---|---|---|
| Example 240 | 0.14 | 0.7/250 | — |
| Example 241 | 0.22 | 2.5/550 | — |
| Example 242 | 2.0 | 16/1300 | 0.6/1,900 |
| Example 243 | 3.0 | 27.3/4700 | 0.8/1,900 |

Example 244 to Example 245

MWCNT/Nanolatex 2 Composite Membranes

An aqueous MWCNT/Nanolatex 2 dispersion 4% (w/w) MWCNT and 2.5% Nanolatex 2, was prepared and coated onto mulberry paper, similarly as described in Example 241 to Example 243. One coating, Example 244, received two coats. Another received four coats (Example 245). These examples were examined by xenon flash thermal diffusivity, and the results are listed in Table 20.

TABLE 20

Electrical Conductivity (σ) and Thermal Diffusivity (D) for MWCNT/Nanolatex 2 Supported (Mulberry) Membranes at 25° C.; [in-plane (∥)]

| Film/Coating | MWCNT (mg/cm²) | σ/(S/cm) ∥ | D/(mm²/s) ∥ |
|---|---|---|---|
| Example 244 | 2.3 | 6.08 | 1580 |
| Example 245 | 5.7 | 8.44 | 940 |

Example 246 to Example 247

MWCNT/Nanolatex 2 Composite Membranes

An aqueous MWCNT/Nanolatex 2 dispersion 4% (w/w) MWCNT and 2.5% Nanolatex 2, was prepared and coated onto fiberglass tissue, similarly as described in Example 244 and Example 245. One coating, Example 246, received two coats. Another received four coats (Example 247). These examples were examined by xenon flash thermal diffusivity, and the results are listed in Table 21. The thermal diffusivity for Example 246 appears the highest ever to be reported for any composite material. Such membranes and composite films should find useful application in the thermal management of advanced electronics, and in the development of useful thermoelectric systems.

TABLE 21

Electrical Conductivity (σ) and Thermal Diffusivity (D) for MWCNT/Nanolatex 2 Supported (Fiberglass Tissue) Membranes at 25° C.; [in-plane (∥)]

| Film/Coating | MWCNT (mg/cm²) | σ/(S/cm) ∥ | D/(mm²/s) ∥ |
|---|---|---|---|
| Example 246 | 2.7 | 5.54 | 5,500 |
| Example 247 | 4.7 | 6.85 | 1,240 |

Example 248 to Example 250

MWCNT/ILBr Membrane Electrodes

An aqueous MWCNT/ILBr dispersion 1% (w/w) MWCNT and 2.5% ILBr was coated onto a fine copper mesh as described in Example 244 and Example 245. An uncoated specimen was retained to use as a comparison control: Example 248. A 5.08 cm×4.35 cm area of fine copper mesh weave was coated twice on each side with the dispersion. The sample was then divided in two, and one half was retained as Example 249. The remaining half, Example 250, was coated on each side twice again. These copper mesh-supported MWCNT membrane electrodes should prove useful as new classes of heat transfer materials in microelectronics, as new catalytic systems and supports in electrocatalysis, and as versatile electrodes for fuel cell and battery applications. The results for the Electrical Conductivity (σ) are listed in Table 22.

TABLE 22

In-plane Electrical Conductivities ($\sigma_{0°}$ and $\sigma_{45}$ in line with weave and rotated 45°, respectively) for MWCNT/ILBr Supported (Copper Mesh) Membranes at 25° C.

| Film/Coating | MWCNT (mg/cm$^2$) | $\sigma_{0°}$(kS/cm) | $\sigma_{45°}$ (kS/cm) |
| --- | --- | --- | --- |
| Example 248 | 0 | 330 | 14 |
| Example 249 | 1.0 | 400 | 1.9 |
| Example 250 | 1.3 | 8 | 0.94 |

Example 251

Catalytic MWCNT Membrane Electrode for Oxygen Reduction

The aqueous WC/Nanolatex dispersion of Example 170 is used to disperse MWCNT as described for Example 163, to produce a MWCNT/WC/Nanolatex dispersion as described for Example 171. This dispersion is then used to produce a catalytic MWCNT electrode by coating said dispersion onto a fine copper mesh as described in Example 250. This membrane electrode is useful for reducing oxygen and for serving as a cathode in fuel cells.

Example 252

Catalytic MWCNT Membrane Electrode for Oxygen Reduction

A membrane electrode as described for Example 251 is fabricated, except a porous fiberglass tissue, as used in Example 246 and Example 247, is used as a coating substrate instead of a fine copper mesh.

Example 253

Catalytic MWCNT Membrane Electrode for Oxygen Reduction

A membrane is fabricated as described for Example 251, except that the copper mesh used is first electroplated with a thin gold layer.

Example 254

MWCNT Membrane Electrode

A membrane is fabricated as described for Example 251, except that the copper mesh used is substituted with a platinum mesh.

Example 255

WC/Nanolatex Film

Example 256

WC/Nanolatex Film

Nanolatex films, Example 255 and Example 256, were made by pouring about 1 g of dispersion Example 168 and Example 169, respectively, into the annular cup in the interior of a polypropylene 50 mL centrifuge cap, and allowing the films to cure by drying. The dried films, 173±2 μm thick, had shiny air/solid surfaces, but were not opaque. They exhibited absorbances at 550 nm of 0.20 (Example 168) and 0.42 (Example 169), respectively, corresponding to the shorter and longer doses used in the precursor dispersion preparation. Thermal diffusivity values of 0.067 and 0.075 mm$^2$/s were determined, respectively, for Example 255 and Example 256. Bulk WC has a thermal diffusivity of about 44 mm$^2$/s.

Example 257

WC/Nanolatex Film

Example 258

WC/Nanolatex Film

Films similar to Example 255 and Example 256 were prepared except that dispersion Example 170 was used to cast the films.

Example 259

MWCNT/Nanolatex 2/Magician's Paper Composite

Commercially available Magician's paper was coated with a MWCNT/Nanolatex dispersion prepared similarly to dispersion Example 170. The top surface of the resulting composite was examined by Fe SEM. There it is seen that the nanolatex particles adsorb conformally onto the MWCNTs. The nanolatex particles appear white in the image, because they tend to charge slightly, while the MWCNTs themselves readily conduct away the impinging high energy electrons.

Example 260

MWCNT Monoliths

The composite of Example 259 was heated in a small muffle furnace modified to maintain an oxygen-free environment. The temperature was maintained at about 600° C. to pyrolyze the Magician's paper and most of the adsorbed nanolatex. A MWCNT monolith was obtained.

Example 261

MWCNT/Cyanoacrylate Monoliths

The monolith of Example 260 was obtained, and then some cyanoacrylate "super glue" was carefully spread over the monolith. On curing the brittleness of the monolith was dramatically reduced.

Example 262

PY138 Pigment/TBII Dispersion

Figure 6:
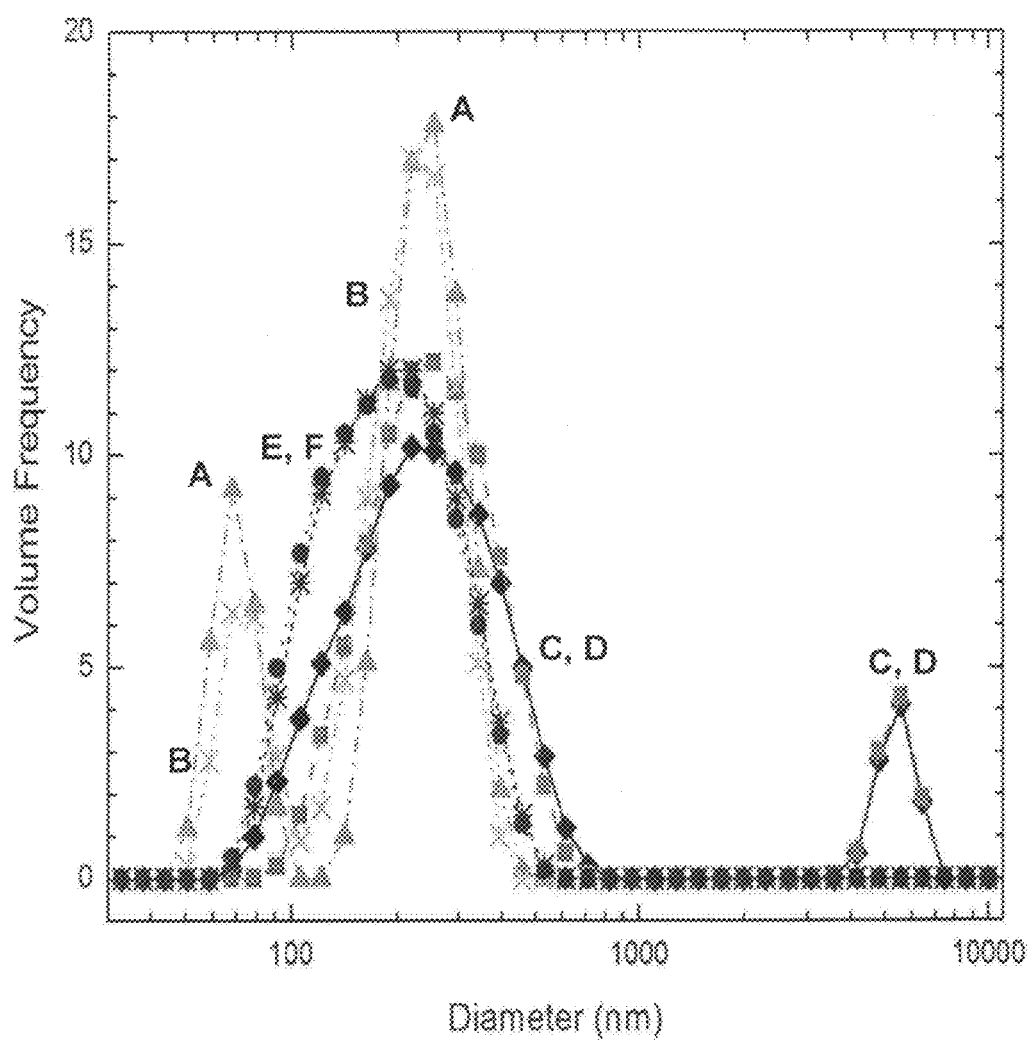
FIG. 6 illustrates volume-based particle size distributions for a stabilized nanoparticle pigment dispersion according to the disclosure. The particle size distributions of PY138/TBII aqueous dispersions were determined by dynamic light scattering. Plots A (-▲-) and B (-X-) (800 nm filter using high resolution data conversion) show that the 200-300 nm particle size is gradually being reduced to about 60 nm. Plots C (-■-) and D (-♦-) (no filtration with normal settings) show there is a bit of loose aggregate in the multimicron size regime. Plots E (-●-) and F (-*-) (800 nm filter using normal settings) show that the distribution is broad, going from about 80 nm to about 300 nm at peak and further.

The ink jet pigment PY138 (pigment yellow 138; Clarient; CAS 30125-47-4) was dispersed by jar milling overnight in water using 0.8 mm diameter grinding beads and stabilizer TBII of Example 54. FIG. 6 illustrates the particle size (volume) distributions obtained. Approximately 30 mL of dispersion was milled that comprised about 1.2 g PY138 pigment and about 100 mg of TBII as dispersant. After milling, the resulting dispersion was separated from the milling media using a fine weave filtration bag.

The highest resolution data of FIG. 6 show that the 200 nm to 300 nm particles are being reduced further to about 60 nm, and illustrate the high efficacy of the TBII as an aqueous dispersing aid. The effects of filtration show that there is some weak aggregation of particles with clusters between 1 μm and 10 μm. It is believed that sub-100 nm size particles would be obtainable with a longer milling time. However, this degree of dispersion suffices for demonstrating the stabilizer efficacy.

Example 263 to Example 270

Polystyrene Latex/TBII Dispersion

Immunization against Debye-Hückel screening induced coagulation. Suspensions were prepared of highly negatively charged polystyrene beads (100 nm and 500 nm in diameter, from Invitrogen). Some suspensions were restabilized by adsorbing an excess of TBII of Example 54. Two control samples (Example 263 (100 nm) and Example 264 (500 nm)) are stabilized with surface sulfate groups and are formed by mixing 0.2 mL of DI water and 1.0 mL of 0.15 w/v polystyrene beads. Two samples (Example 265 (100 nm) and Example 266 (500 nm)) are restabilized with adsorbed TBII and are formed by mixing 1.0 mL of 0.15 w/v Invitrogen beads and 0.2 ml of aqueous TBII (0.00101 g/ml in water). Concentrated aqueous KBr is then added to each of the four suspensions (1.0 ml of 1.0 M aqueous KBr added). In the cases of the sulfate-stabilized beads in the control samples (Example 267 (100 nm) and Example 268 (500 nm)), the added aqueous KBr causes rapid coagulation due to the electrostatic screening provided by the high concentration of indifferent electrolyte, KBr. In the samples with TBII-restabilized beads and added KBr (Example 269 (100 nm) and Example 270 (500 nm)), the beads are immunized against this high electrolyte induced coagulation, and the bead suspension remains unperturbed and stable. These respective coagulation and continued stable suspension effects are seen for both polystyrene bead sizes.

Because other modifications and changes varied to fit particular operating requirements and environments will be apparent to those skilled in the art, the disclosure is not considered limited to the examples chosen for purposes of illustration, and covers all changes and modifications which do not constitute departures from the true spirit and scope of this disclosure.

Accordingly, the foregoing description is given for clarity of understanding only, and no unnecessary limitations should be understood therefrom, as modifications within the scope of the disclosure may be apparent to those having ordinary skill in the art.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Component concentrations expressed as a percent are weight-percent (% w/w), unless otherwise noted. Numerical values and ranges can represent the value/range as stated or an approximate value/range (e.g., modified by the term "about"). Combinations of components are contemplated to include homogeneous and/or heterogeneous mixtures, as would be understood by a person of ordinary skill in the art in view of the foregoing disclosure.

What is claimed is:

1. A nanoparticle dispersion comprising:
(a) an aqueous liquid medium;
(b) an ionic liquid-based stabilizer in the aqueous liquid medium, the ionic liquid-based stabilizer comprising:
(i) an aromatic heterocyclic ring having at least one quaternary ammonium cation in the ring,
(ii) a counter anion to the quaternary ammonium cation, and
(iii) optionally a surfactant moiety covalently bound to the aromatic heterocyclic ring,
wherein the ionic liquid-based stabilizer is in the form of a polymer comprising the aromatic heterocyclic rings as pendant groups from the polymer backbone; and
(c) nanoparticles dispersed in the aqueous liquid medium, the nanoparticles being present in an amount ranging from 0.01 wt. % to 10 wt. % relative to the dispersion weight.

2. The dispersion of claim 1, wherein the nanoparticles comprise carbon.

3. The dispersion of claim 1, wherein the nanoparticles comprise carbon nanotubes (CNT).

4. The dispersion of claim 3, wherein the nanoparticles comprise single-walled carbon nanotubes (SWCNT).

5. The dispersion of claim 3, wherein the nanoparticles comprise multi-walled carbon nanotubes (MWCNT).

6. The dispersion of claim 1, wherein the nanoparticles are selected from the group consisting of nanotubes, nanorings, nanowires, nanorods, and combinations thereof.

7. The dispersion of claim 1, wherein the nanoparticles comprise a material selected from the group consisting of Ag, Au, Co, N, Ni, Pd, Pt, $SnO_2$, $TiO_2$, W, $WO_3$, ZnO, and combinations thereof.

8. The dispersion of claim 1, wherein the nanoparticles are selected from the group consisting of organic nanoparticles, nitrides, and carbides.

9. The dispersion of claim 1, wherein the aromatic heterocyclic ring has a 5-atom or 6-atom ring structure and optionally includes one or more additional ring heteroatoms selected from the group consisting of N, O, and S.

10. The dispersion of claim 1, wherein the aromatic heterocyclic ring is selected from the group consisting of pyridinium, pyridazinium, pyrimidinium, pyrazinium, imidazolium, pyrazolium, thiazolium, oxazolium, and triazolium.

11. The dispersion of claim 1, wherein one or more of the surfactant moieties are present as linking groups between the polymer backbone and a corresponding pendant aromatic heterocyclic ring.

12. The dispersion of claim 1, wherein the polymer is selected from the group consisting of homopolymers, random copolymers, block copolymers, and combinations thereof of monomers comprising the aromatic heterocyclic ring.

13. The dispersion of claim 1, wherein the polymer is in the form of latex nanoparticles suspended in the aqueous liquid medium.

14. The dispersion of claim 1, wherein the polymer is in solution in the aqueous liquid medium.

15. A nanoparticle dispersion comprising:
(a) an aqueous liquid medium;
(b) an ionic liquid-based stabilizer in the aqueous liquid medium, the ionic liquid-based stabilizer comprising:
(i) an aromatic heterocyclic ring having at least one quaternary ammonium cation in the ring,
(ii) a counter anion to the quaternary ammonium cation, and
(iii) an ethylenically reactive surfactant moiety covalently bound to the aromatic heterocyclic ring,
wherein the ionic liquid-based stabilizer is in the form of an ionic liquid surfactant comprising the aromatic heterocyclic ring, the counter anion, and the surfactant moiety; and (c) nanoparticles dispersed in the aqueous liquid medium, the nanoparticles being present in an amount ranging from 0.5 wt. % to 20 wt. % relative to the dispersion weight.

16. A nanoparticle composite film comprising:
(a) a film comprising
  (i) nanoparticles present in an amount ranging from 0.01 wt. % to 20 wt. % relative to the film, and
  (ii) an ionic liquid-based stabilizer stabilizing adjacent nanoparticles in the film, wherein the ionic liquid-based stabilizer comprises: (A) an aromatic heterocyclic ring having at least one quaternary ammonium cation in the ring, (B) a counter anion to the quaternary ammonium cation, and (C) optionally a surfactant moiety covalently bound to the aromatic heterocyclic ring; and
(b) optionally, a substrate to which the film is applied.

17. The nanoparticle composite of claim 16, wherein the ionic liquid-based stabilizer is in the form of a polymer comprising the aromatic heterocyclic rings as pendant groups from the polymer backbone.

18. The nanoparticle composite of claim 16, wherein the ionic liquid-based stabilizer is in the form of an ionic liquid surfactant comprising the aromatic heterocyclic ring, the counter anion, and an ethylenically reactive surfactant moiety as the surfactant moiety.

19. The nanoparticle composite of claim 16, wherein the film is electrically conducting.

20. The nanoparticle composite of claim 16, wherein the film is thermally conducting.

21. The nanoparticle dispersion of claim 15, wherein a weight ratio of the ionic liquid-based stabilizer to the dispersed nanoparticles present in the dispersion ranges from 0.15 to 5.

22. The nanoparticle dispersion of claim 15, wherein a weight ratio of the ionic liquid-based stabilizer to the dispersed nanoparticles present in the dispersion ranges from 0.2 to 3.

23. The nanoparticle dispersion of claim 15, wherein:
  (i) the ionic liquid-based stabilizer has a structure selected from the group consisting of $CH_2$=$C(X)Y$—R-($AHR^+$)($CA^-$) and $CH_2$=$C(X)Y$-($AHR^+$—R)($CA^-$);
  (ii) $AHR^+$ is the aromatic heterocyclic ring;
  (iii) $CA^-$ is the counter anion;
  (iv) X is selected from the group consisting of H, a halogen, and an alkyl group containing 1 to 6 carbon atoms;
  (v) Y is selected from the group consisting of —R'—, —O—, —CO—, —$CO_2$—, —$SO_2$—, —CON(R')—, —$SO_2$N(R'), —N(R')CON(R')—, —N(R')$CO_2$—, —$COCH_2CH_2$—, —$OCOCH_2CH_2$—, —N(R')$COCH_2CH_2$—, —$OSO_2CH_2CH_2$—, and —$SO_2CH_2CH_2$—, wherein R' is H or an alkyl group containing 1 to 6 carbon atoms; and
  (vi) R is a hydrocarbon group containing 4 to 18 carbon atoms.

24. The dispersion of claim 2, wherein the nanoparticles comprise graphene.

25. The dispersion of claim 1, wherein the nanoparticles comprise a carbide.

26. The dispersion of claim 1, wherein the aromatic heterocyclic ring comprises an imidazolium group.

* * * * *